US008247065B2

(12) United States Patent
Best et al.

(10) Patent No.: US 8,247,065 B2
(45) Date of Patent: Aug. 21, 2012

(54) LINEAR POLYMERS, POLYMER BLENDS, AND ARTICLES MADE THEREFROM

(75) Inventors: Steven A. Best, The Woodlands, TX (US); Bernard L. Bossaert, Dilbeek (BE); Ronald N. Cooke, Sarnia (CA); Paul M. German, Friendswood, TX (US); Blair A. Graham, Brights Grove (CA); Carlos A. Mota, Sarnia (CA); Calvin K. Schram, Sarnia (CA); Barry C. Trudell, Sarnia (CA)

(73) Assignee: ExxonMobil Chemical Patents Inc., Houston, TX (US)

( * ) Notice: Subject to any disclaimer, the term of this patent is extended or adjusted under 35 U.S.C. 154(b) by 219 days.

(21) Appl. No.: 11/789,391

(22) Filed: Apr. 24, 2007

(65) Prior Publication Data

US 2008/0038533 A1 Feb. 14, 2008

Related U.S. Application Data

(60) Provisional application No. 60/809,509, filed on May 31, 2006.

(51) Int. Cl.
*B32B 27/32* (2006.01)
*C08F 210/02* (2006.01)
*C08J 5/18* (2006.01)
*C08L 23/06* (2006.01)

(52) U.S. Cl. ............... 428/220; 264/310; 264/328.1; 264/510; 264/555; 524/570; 525/240; 526/348

(58) Field of Classification Search .................. 428/220; 526/113, 348; 525/191
See application file for complete search history.

(56) References Cited

U.S. PATENT DOCUMENTS

| | | | |
|---|---|---|---|
| 5,008,204 A | 4/1991 | Stehling | |
| 5,382,631 A * | 1/1995 | Stehling et al. | 525/240 |
| 5,569,693 A | 10/1996 | Doshi et al. | |
| 5,749,202 A | 5/1998 | Eichbauer | |
| 5,752,362 A | 5/1998 | Eichbauer | |
| 5,814,399 A | 9/1998 | Eichbauer | |
| 5,902,684 A | 5/1999 | Bullard et al. | |
| 5,907,942 A | 6/1999 | Eichbauer | |
| 5,907,943 A | 6/1999 | Eichbauer | |
| 5,922,441 A | 7/1999 | Eichbauer | |
| 5,925,448 A | 7/1999 | Moy et al. | |
| 5,976,682 A | 11/1999 | Eichbauer | |
| 5,998,017 A | 12/1999 | Eichbauer | |
| 6,083,611 A | 7/2000 | Eichbauer et al. | |
| 6,093,480 A | 7/2000 | Eichbauer | |
| 6,242,545 B1 | 6/2001 | Jejelowo et al. | |
| 6,248,845 B1 | 6/2001 | Loveday et al. | |
| 6,265,055 B1 | 7/2001 | Simpson et al. | |
| 6,448,341 B1 * | 9/2002 | Kolthammer et al. | 525/240 |
| 6,528,597 B2 | 3/2003 | Loveday et al. | |
| 6,574,851 B1 * | 6/2003 | Mirizzi | 29/527.5 |
| RE38,429 E | 2/2004 | Eichbauer | |
| RE38,658 E | 11/2004 | Eichbauer | |
| 6,936,675 B2 | 8/2005 | Szul et al. | |
| 6,956,088 B2 | 10/2005 | Farley et al. | |
| 7,122,607 B2 | 10/2006 | Hagerty et al. | |
| 7,157,531 B2 | 1/2007 | Szul et al. | |
| 7,172,816 B2 | 2/2007 | Szul et al. | |
| 7,179,876 B2 | 2/2007 | Szul et al. | |
| 2003/0149181 A1 * | 8/2003 | Kolthammer et al. | 525/240 |
| 2003/0216518 A1 * | 11/2003 | Tau et al. | 525/191 |
| 2004/0097365 A1 | 5/2004 | Loveday et al. | |
| 2004/0176242 A1 | 9/2004 | Ishihama et al. | |
| 2004/0249091 A1 * | 12/2004 | Loveday et al. | 526/113 |
| 2005/0064161 A1 | 3/2005 | Ravel et al. | |
| 2005/0171283 A1 | 8/2005 | Szul et al. | |
| 2005/0215716 A1 | 9/2005 | Szul et al. | |
| 2006/0188678 A1 | 8/2006 | Ohlsson et al. | |
| 2008/0038533 A1 | 2/2008 | Best et al. | |

FOREIGN PATENT DOCUMENTS

| | | |
|---|---|---|
| EP | 1 416 001 | 5/2004 |
| EP | 1518868 | 3/2005 |
| WO | 90/03414 | 4/1990 |
| WO | 93/03093 | 2/1993 |
| WO | 99/29737 | 6/1999 |
| WO | WO 0198409 A1 * | 12/2001 |
| WO | WO 02070602 A2 * | 9/2002 |
| WO | 03/000790 | 1/2003 |
| WO | WO 2004000919 A1 * | 12/2003 |
| WO | 2004/005357 | 1/2004 |
| WO | 2005/103095 | 11/2005 |

OTHER PUBLICATIONS

Lilli, Sherman, Clearly Tough New PE Film Resins Also Score High on Processability, Jan. 1, 2000, Plastics Technology.*
Elkoun, S., et al.; "LLDPE-Based Mono- and Multilayer Blown Films: Effect of Processing Parameters on Properties", Polymer Engineering and Science, 2005, pp. 1214-1221.
Hitchcock, A.B., et al. Effect of Processing Parameters on the Film Properties of High Strength Linear Low Density and Ultra Low Density Polyethylenes, Polyolefins, 2001, pp. 165-169, The International Conference on Polyolefins; Houston, Texas, Feb. 25-28, 2001.
Sun, T. et al., "Effect of Short Chain Branching on the Coil Dimensions of Polyolefins in Dilute Solution" Macromolecules, 2001, vol. 34, No. 19, p. 6812-6820.
Wild L., et al., "Determination of Branching Distributions in Polyethylene and Ethylene Copolymers", Journal of Polymer Science, Polymer Physics Edition, 1982, vol. 20, p. 441-455.

* cited by examiner

*Primary Examiner* — David Sample
*Assistant Examiner* — Tahseen N Khan
(74) *Attorney, Agent, or Firm* — Stephen Timmins; Leandro Archederra; Robert Abdon

(57) ABSTRACT

Provided are blends of linear low density polyethylene copolymers with very low density, low density, medium density, high density, and differentiated polyethylenes and other polymers. The invention also includes articles produced from the linear low density polyethylene and polyethylene blends described herein.

39 Claims, 6 Drawing Sheets

LINEAR POLYMERS, POLYMER BLENDS, AND ARTICLES MADE THEREFROM

CROSS REFERENCE TO RELATED APPLICATIONS

Figure 1:
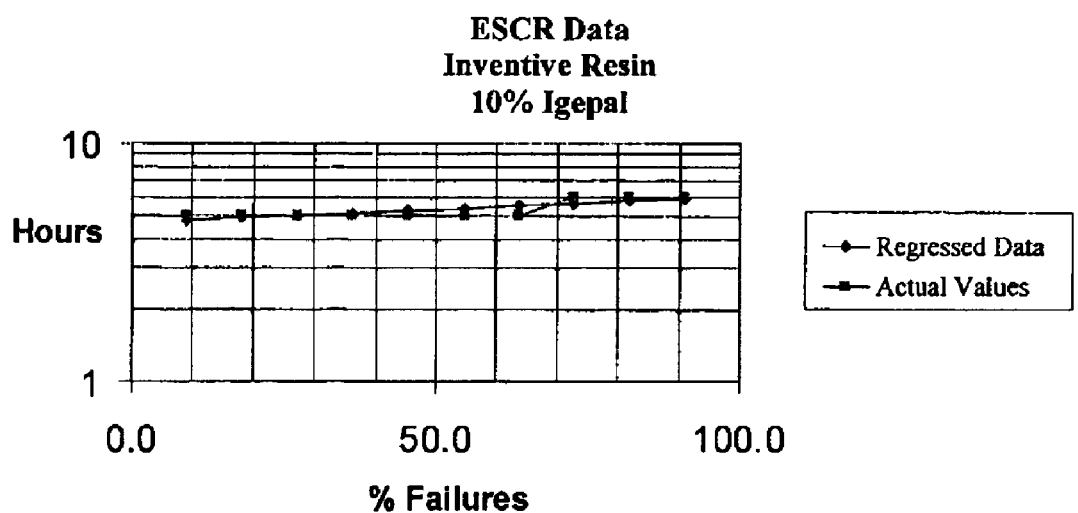
Figure 2:
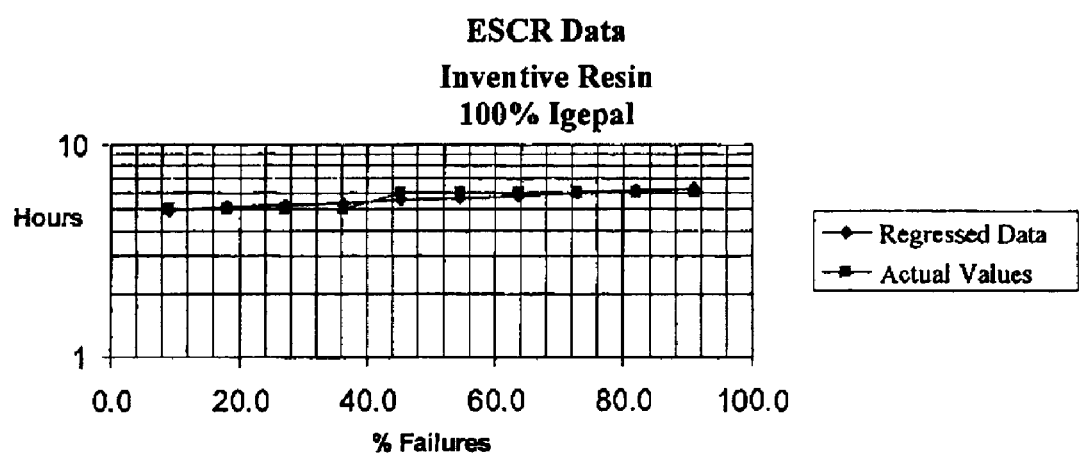
Figure 3:
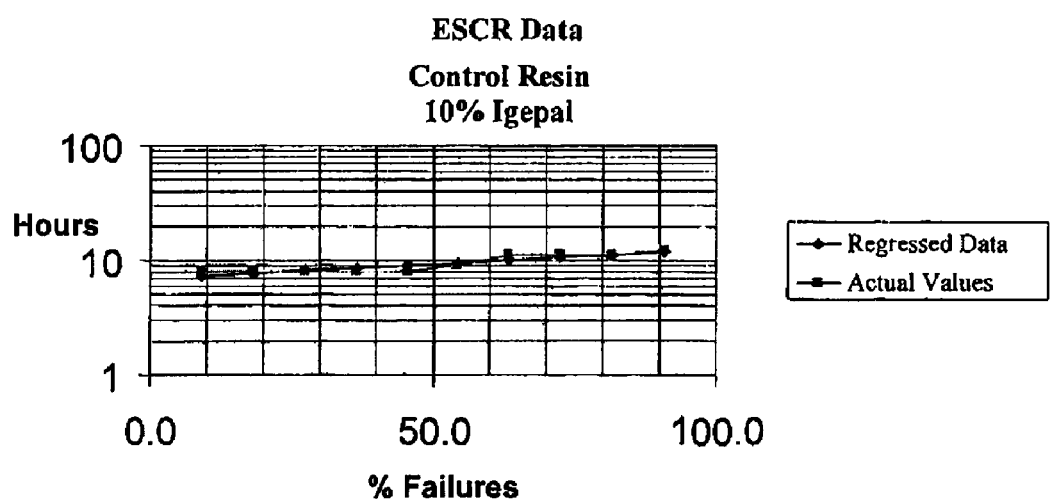
Figure 4:
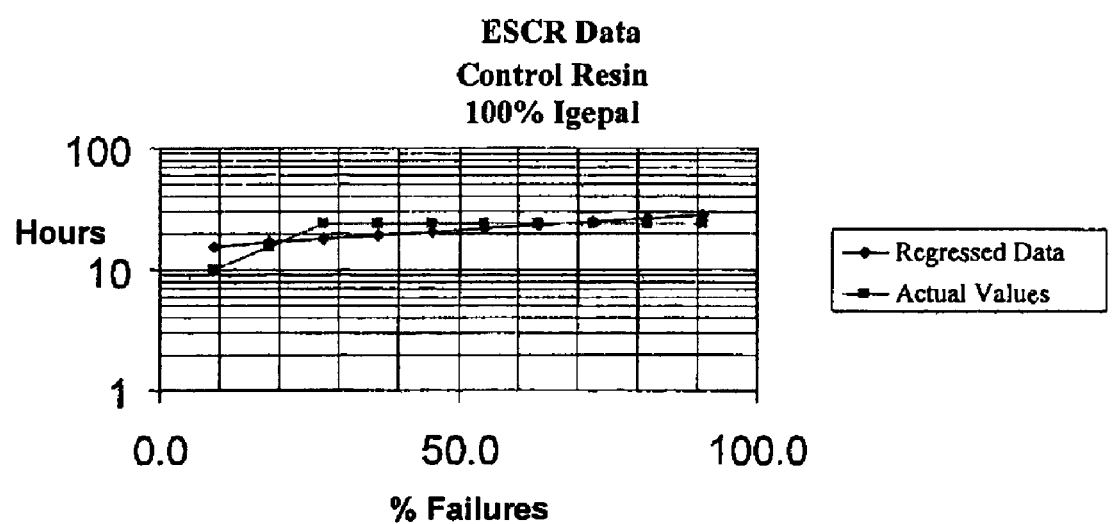
Figure 5:
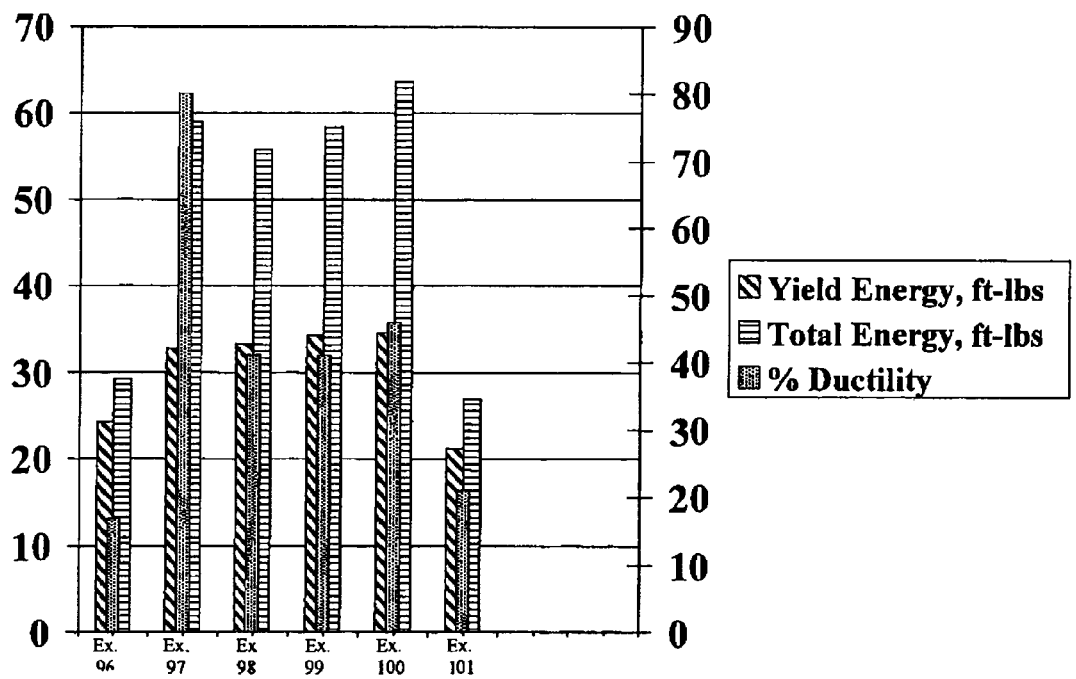
Figure 6:
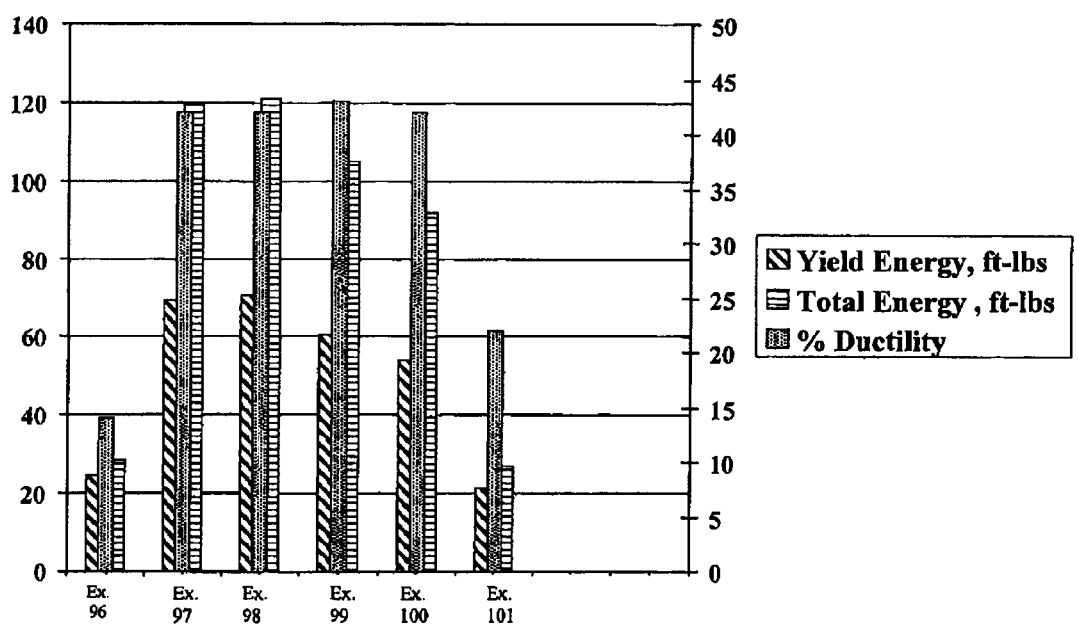

This application claims priority benefit to U.S. Provisional Application No. 60/809,509, filed May 31, 2006, which is herein incorporated by reference in its entirety.

FIELD OF THE INVENTION

The present invention is directed to linear low density polyethylene polymers, polymer blends, methods for making the same, and articles made therefrom. In particular, provided are blends of linear low density polyethylene polymers with other linear low density polyethylenes or with very low density, medium density, high density, and differentiated polyethylenes.

BACKGROUND OF THE INVENTION

Linear low density polyethylenes, and blends and articles made therefrom, are generally known in the art. Such polymers and polymer blends have typically been made from a linear low density polyethylene produced using a Ziegler-Natta catalyst in a gas phase process.

U.S. Pat. No. 6,242,545 describes a process for the polymerization of monomers utilizing a bulky ligand hafnium transition metal metallocene-type catalyst compound. The patent also describes the catalyst compound, which comprises at least one cyclopentadienyl ligand including at least one linear or isoalkyl substitutent of at least three carbon atoms.

U.S. Pat. Nos. 6,248,845 and 6,528,597 describe single reactor processes for the polymerization of monomers utilizing a bulky ligand hafnium transition metal metallocene-type catalyst compound. These patents also describe an ethylene polymer composition produced by using bulky ligand hafnium metallocene-type catalysts.

U.S. Pat. No. 6,956,088 describes metallocene-catalyzed polyethylenes having relatively broad composition distribution and relatively broad molecular weight distribution. The patent also describes films produced therefrom.

U.S. Pat. No. 6,936,675 and U.S. patent application Ser. Nos. 11/098,077 and 11/135,882 describe polyethylene films produced from a polymer obtained using a hafnium-based metallocene catalyst. Methods for manufacturing the films are also described.

While many prior art documents describe processes and polymers using the same monomers as those described herein and similar processes to those described herein, none describe polymer blends and articles made from those polymer blends, particularly those providing improved physical properties, improved processability, and improved balance of properties.

SUMMARY OF THE INVENTION

Provided are polymer blend compositions comprising a blend of a first linear low density polyethylene (LLDPE) polymer and a second polyethylene polymer or copolymer. The first LLDPE is an ethylene-based polymer produced by polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 mole % to about 99 mole % of the hafnium compound. Further, the ethylene-alpha-olefin polymer has up to about 5 mole % units derived from an alpha-olefin, a melt index of from about 0.1 g/10 min to about 300 g/10 min, a melt index ratio of from about 15 to about 45, a weight average molecular weight ($M_w$) of from about 20,000 to about 200,000, a molecular weight distribution ($M_w/M_n$) of from about 2.0 to about 4.5, and a $M_z/M_w$ ratio of from about 1.7 to about 3.5. The first LLDPE has a density of from about 0.910 g/cm³ to about 0.955 g/cm³. As used herein when referring to the first LLDPE, the term "polymer" is to be understood to include both ethylene polymers and copolymers of ethylene with an alpha-olefin or other comonomer.

The second polyethylene polymer or copolymer blended with the first LLDPE may be a very low density polyethylene (VLDPE), another linear or non-linear low density polyethylene (LDPE), a medium density polyethylene (MDPE), a high density polyethylene (HDPE), a differentiated polyethylene (DPE), another polymer, or combinations of the foregoing.

Also provided are articles made from both the first LLDPE polymer alone and also from the polyethylene blends described herein. These articles include monolayer and multilayer blown, extruded, and/or cast stretch and/or shrink films; wire and cable coating compositions; articles formed by injection molding, rotational molding, blow molding, extrusion coating, and/or casting; and combinations thereof.

DETAILED DESCRIPTION OF THE INVENTION

Definitions

For the purposes of this disclosure, the following definitions will apply:

Molecular weight distribution ("MWD") is equivalent to the expression $M_w/M_n$. The expression $M_w/M_n$ is the ratio of the weight average molecular weight ($M_w$) to the number average molecular weight ($M_n$). The weight average molecular weight is given by:

$$M_w = \frac{\sum_i n_i M_i^2}{\sum_i n_i M_i}$$

The number average molecular weight is given by $$M_n = \frac{\sum_i n_i M_i}{\sum_i n_i}$$

The z-average molecular weight is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, pg. 6812 (2001).

Composition distribution breadth index ("CDBI") is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, Vol. 20, pg. 441 (1982) and U.S. Pat. No. 5,008,204, which are fully incorporated herein by reference.

Solubility distribution breadth index ("SDBI") is used as a measure of the breadth of the solubility distribution curve for a given polymer. The procedure used herein for calculating SDBI is as described in pages 16 through 18 of PCT Patent Application WO 93/03093, published Feb. 18, 1993.

Both CDBI and SDBI may be determined using data obtained via CRYSTAF. In such cases, a commercial CRYSTAF model 200 instrument (PolymerChar S.A.) is used for chemical composition distribution (CCD) analysis. Approximately 20 to 30 mg of polymer is placed into each reactor and dissolved in 30 mL of 1,2 dichlorobenzene at 160° C. for approximately 60 minutes, then allowed to equilibrate for approximately 45 minutes at 100° C. The polymer solution is then cooled to either 30° C. (standard procedure) or 0° C. (cryo procedure) using a cooling rate of 0.2° C./min. A two wavelength infrared detector is then used to measure the polymer concentration during crystallization (3.5 μm, 2853 cm$^{-1}$ sym. stretch) and to compensate for base line drifts (3.6 μm) during the analysis time. The solution concentration is monitored at certain temperature intervals, yielding a cumulative concentration curve. The derivative of this curve with respect to temperature represents the weight fraction of crystallized polymer at each temperature. In both standard and cryo procedures, any resin in solution below the temperature to which the solution is cooled is defined as "% solubles." The cryo procedure outlined above, i.e., cooling to 0° C., typically provides greater detail, especially for amorphous samples that tend to stay in solution at or around 30° C.

LLDPE Polymers
Catalyst Components and Catalyst Systems

Suitable catalysts include hafnium transition metal metallocene-type catalyst systems for polymerizing one or more olefins. The one or more metallocene catalyst components are represented by the formula:

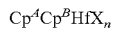

wherein each X is chemically bonded to Hf, each Cp group is chemically bonded to Hf, and n is 0 or an integer from 1 to 4. Preferably, n is 1 or 2. The ligands represented by Cp$^A$ and Cp$^B$ may be the same or different cyclopentadienyl ligands or ligands isolobal to cyclopentadienyl, either or both of which may contain heteroatoms and either or both of which may be substituted by a group R. In one embodiment, Cp$^A$ and Cp$^B$ are independently selected from the group consisting of cyclopentadienyl, indenyl, tetrahydroindenyl, fluorenyl, and substituted derivatives of each.

Independently, each Cp$^A$ and Cp$^B$ may be unsubstituted or substituted with any one or combination of substituent groups R. Non-limiting examples of substituent groups R include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

Exemplary hafnocene catalyst systems used to produce LLDPEs are set forth in the description and examples of U.S. Pat. Nos. 6,936,675 and 6,528,597, both of which are fully incorporated herein by reference. The hafnocene catalyst systems used herein produce polymers having higher molecular weights in comparison to zirconocene equivalents at the same or similar polymerization conditions. Additionally, the substituted hafnocenes used herein tend to produce lower density polymer products than zirconocene equivalents at substantially the same molecular weight.

Further description of catalyst systems are found in U.S. Pat. Nos. 6,242,545; 6,248,845; and 6,956,088, and in U.S. Application Publication Nos. 2005/0171283 A1 and 2005/0215716 A1, all of which are fully incorporated herein by reference.

Polymerization Process

The hafnium transition metal metallocene-type catalyst compounds and catalyst systems presently employed are suited for the polymerization of monomers, and, optionally, one or more comonomers, in any catalytic polymerization process, solution phase, gas phase, or slurry phase. Preferably, a gas or slurry phase process is used. In particular, the process used to polymerize LLDPEs is as described in the text and examples of U.S. Pat. Nos. 6,936,675 and 6,528,597, which are fully incorporated herein by reference.

Polymer Product

The polymer blends and end-use applications include a linear low density polyethylene (LLDPE) polymer. As used herein, the terms "linear low density polyethylene" and "LLDPE," when used to refer to the inventive polymers, refer to a polyethylene homopolymer or, preferably, copolymer having minimal long chain branching and a density generally from about 0.910 g/cm$^3$ to about 0.955 g/cm$^3$. Polymers having more than two types of monomers, such as terpolymers, are also included within the term "copolymer" as used herein.

The LLDPEs may have a broad composition distribution as measured by Composition Distribution Breadth Index (CDBI) or solubility distribution breadth index (SDBI). Further details of determining the CDBI or SDBI of a copolymer are known to those skilled in the art. See, for example, PCT Patent Application WO 93/03093, published Feb. 18, 1993.

Polymers produced using the catalyst systems described herein may have a CDBI less than 50%, preferably less than 40%, and more preferably less than 30%. In one embodiment, the polymers have a CDBI of from 20% to 50%. In another embodiment, the polymers have a CDBI of from 20% to 35%. In yet another embodiment, the polymers have a CDBI of from 25% to 28%.

LLDPE polymers produced using the catalyst systems described herein may have an SDBI greater than 15° C., or greater than 16° C., or greater than 17° C., or greater than 18° C., or greater than 19° C., or greater than 20° C. In one embodiment, the polymers have a SDBI of from about 18° C. to about 22° C. In another embodiment, the polymers have a SDBI of from about 18.7° C. to about 21.4° C. In another embodiment, the polymers have a SDBI of from about 20° C. to about 22° C.

Alternatively, the processes used to produce LLDPEs may also be tailored to produce polymers having a narrow composition distribution as measured by CDBI or SDBI. LLDPE polymers having a narrow composition distribution may have a CDBI greater than 50%, preferably greater than 60% or 70%. Typically, such polymers have a CDBI between about 50% and about 80%, or about 45 to about 75.

In one aspect, the polymers have a density in the range of from 0.86 g/cc to 0.97 g/cm$^3$, preferably in the range of from 0.90 g/cm$^3$ to 0.960 g/cm$^3$, more preferably in the range of from 0.905 g/cm$^3$ to 0.955 g/cm$^3$, and most preferably in the range of from 0.910 g/cm$^3$ to 0.955 g/cm$^3$. Density is measured in accordance with ASTM D-1238.

The LLDPEs typically have a weight average molecular weight of from about 15,000 to about 250,000. Preferably, the weight average molecular weight is from about 20,000 to about 200,000, or from about 25,000 to about 150,000.

The polymers have a molecular weight distribution ($M_w/M_n$) of from about 1.5 to about 5, particularly from about 2.0 to about 4.0, preferably from about 3.0 to about 4.0 or from about 2.5 to about 4.0.

The polymers have a ratio of z-average molecular weight to weight average molecular weight of greater than about 1.5 or greater than about 1.7 or greater than about 2.0. In one embodiment, this ratio is from about 1.7 to about 3.5. In yet another embodiment, this ratio is from about 2.0 to about 3.0, or from about 2.2 to about 3.0.

The polymers made by the described processes can in certain embodiments have a melt index (MI) or ($I_{2.16}$) as measured by ASTM D-1238-E (190/2.16) in the range from about 0.1 to about 300 dg/min, preferably from about 0.2 to about 100 dg/min, more preferably from about 0.3 to about 50 dg/min.

In one embodiment, the polymers have a melt index ratio ($I_{21.6}/I_{2.16}$) ($I_{21.6}$ is measured by ASTM D-1238-F) (190/21.6) of from about 10 to about 50. The polymers, in a preferred embodiment, have a melt index ratio of from about 15 to about 45, more preferably from about 20 to about 40.

In some embodiments, LLDPE polymers have a melt index, I2.16, of from about 0.1 to about 2. Preferably, LLDPE polymers have a melt index, I2.16, of from about 0.1 to about 1.5, or from about 0.3 to about 1.5, or from about 0.8 to about 1.2. In one embodiment, LLDPE polymers have a melt index, I2.16, of about 1.

In some embodiments, LLDPE polymers exhibit a density of about 0.910 to about 0.935, or from about 0.910 to about 0.930, or from about 0.912 to about 0.925, or from about 0.915 to about 0.921. In one embodiment, LLDPE polymers exhibit a density of about 0.918.

In some embodiments, LLDPE polymers exhibit a melt index ratio, $I_{21.6}/I_{2.16}$, of from about 15 to about 45, or from about 20 to about 40, or from about 22 to about 38.

In some embodiments, LLDPE polymers exhibit a melting temperature as measured by differential scanning calorimetry ("DSC") of from about 90° C. to about 130° C. An exemplary method of identifying a composition's melting temperature is determined by first pressing a sample of the composition at elevated temperature and removing the sample with a punch die. The sample is then annealed at room temperature. After annealing, the sample is placed in a differential scanning calorimeter, e.g., Perkin Elmer 7 Series Thermal Analysis System, and cooled. Then the sample is heated to a final temperature and the thermal output, $\Delta H_f$, is recorded as the area under the melting peak curve of the sample. The thermal output in joules is a measure of the heat of fusion. The melting temperature, $T_m$, is recorded as the temperature of the greatest heat absorption within the range of melting of the sample. This is called the first melt. $T_{c1}$ is the first non-isothermal crystallization temperature, which is recorded as the temperature of greatest heat generation. The sample is then cooled. The sample is reheating to form a second melt, which is more reproducible than the first melt. The peak melting temperature from the second melt is recorded as the second melting temperature, $T_m$. $T_{c2}$ is second non-isothermal crystallization temperature, and $\Delta H_{c2}$ is the second heat of crystallization. Preferably, LLDPE polymers of these embodiments exhibit a $2^{nd}$ melt temperature of from about 100° C. to about 130° C., or about 110° C. to about 130° C., or from about 119° C. to about 123° C. Preferably, LLDPE polymers of these embodiments exhibit a first melt temperature of from about 95 to about 125, or from about 100 to about 118, or from about 107 to about 110.

In another embodiment, the polymers produced by the processes described herein, particularly in slurry or gas phase process, contain less than 5 ppm hafnium, generally less than 2 ppm hafnium, preferably less than 1.5 ppm hafnium, more preferably less than 1 ppm hafnium. In an embodiment, the polymer contains in the range of from about 0.01 ppm to about 2 ppm hafnium, preferably in the range of from about 0.01 ppm to about 1.5 ppm hafnium, more preferably in the range of from about 0.01 ppm to 1 or less ppm hafnium.

In one embodiment, the polymerization product is a linear low-density polyethylene (LLDPE) resin produced by polymerization of ethylene and, optionally, an alpha-olefin comonomer having from 3 to 20 carbon atoms, preferably hexene-1. The ethylene-based polymers may have up to about 5 mole % alpha-olefin comonomer incorporated into the copolymer.

In the processes used to manufacture the LLDPEs described herein, the monomer supplied to the polymerization zone is regulated to provide a ratio of ethylene to alpha-olefin comonomer so as to yield a polyethylene having a comonomer content, as a bulk measurement, of from about 0.5 to about 5.0 mole % comonomer. The reaction temperature, monomer residence time, catalyst system component quantities, and molecular weight control agent (such as $H_2$) may be regulated so as to provide a LLDPE resin having a weight average molecular weight from about 20,000 to about 200,000, and a molecular weight distribution value of from about 2.0 to about 4.5.

The LLDPE resins are more easily extruded into film products by cast or blown bubble film processing techniques with lower motor load, higher throughput and reduced head pressure as compared to traditional LLDPE resins of comparable comonomer type and density. The inventive resins have a comparable MI and generally a higher weight average molecular weight than traditional LLDPEs.

Persons having skill in the art will recognize that the above-described processes may be tailored to achieve desired LLDPE resins. For example, comonomer to ethylene concentration or flow rate ratios are commonly used to control resin density. Similarly, hydrogen to ethylene concentrations or flow rate ratios are commonly used to control resin molecular weight. In both cases, higher levels of a modifier results in lower values of the respective resin parameter. Gas concentrations may be measured by, for example, an on-line gas chromatograph or similar apparatus to ensure relatively constant composition of recycle gas streams. One skilled in the art will be able to optimize these modifier ratios and the given reactor conditions to achieve a targeted resin melt index, density, and/or other resin properties. This approach was used herein to produce the range of inventive LLDPE resins employed in the subsequent data and examples.

Additionally, the use of a process continuity aid, while not required, may be desirable in any of the foregoing processes. Such continuity aids are well known to persons of skill in the art and include, for example, metal stearates.

Polymer Blends

For the purposes of this disclosure, the following definitions will be generally applicable.

Low density polyethylene (LDPE) may be prepared in high pressure polymerization using free radical initiators, and typically has a density in the range of 0.915-0.935 g/cm$^3$. LDPE is also known as "branched" or "heterogeneously branched" polyethylene because of the relatively large number of long chain branches extending from the main polymer backbone. LDPE has been commercially manufactured since the 1930s and is well known in the art.

Polyethylene in an overlapping density range, i.e., 0.890 to 0.945 g/cm³, typically from 0.915 to 0.945 g/Cm³, which is linear and does not contain long chain branching is also known. This traditional "linear low density polyethylene" (LLDPE) can be produced with conventional Ziegler-Natta catalysts, vanadium catalysts, or with metallocene catalysts in gas phase reactors and/or with metallocene catalysts in slurry reactors and/or with any of the hafnocene catalysts described herein in solution reactors. The LLDPE reaction systems are relatively low pressure reactor systems. LLDPE has also been commercially manufactured for a long time (since the 1950s for solution reactors, and since the 1980s for gas phase reactors) and is also well known in the art. LLDPE known in the art and not encompassed by the description of the inventive LLDPEs above will hereinafter be referred to as "traditional LLDPE".

Very low density polyethylene (VLDPE) is a subset of LLDPE. VLDPEs can be produced by a number of different processes yielding polymers with different properties, but are generally described as polyethylenes having a density typically from 0.890 or 0.900 g/cm³ to less than 0.915 g/cm³. VLDPE is also well known in the art.

Relatively higher density linear polyethylene, typically in the range of 0.930 to 0.945 g/cm³, while often considered to be within the scope of low density polyethylene, is also sometimes referred to as "medium density polyethylene" (MDPE). MDPE can be made in any of the above processes with each of the catalyst systems described herein and, additionally, chrome catalyst systems. MDPEs have also been commercially manufactured for quite some time.

Polyethylene having a still greater density is referred to as "high density polyethylene" (HDPE), i.e., polyethylene having a density greater than 0.945 g/cm³. HDPE is typically prepared with either Ziegler-Natta or chromium-based catalysts in slurry reactors, gas phase reactors, or solution reactors. HDPE has been manufactured commercially for a long time (since the 1950s in slurry systems) and is well known in the art. "Medium-high molecular weight. HDPE" is hereinafter defined as HDPE having a Melt Index (MI) ranging from about 0.1 g/10 min to about 1.0 g/10 min.

A further class of polyethylene polymers is "differentiated polyethylene" (DPE). Differentiated polyethylenes are defined herein as those polyethylene polymers that comprise polar comonomers or termonomers. Typical DPEs are well known in the art and include, but are not limited to, ethylene polymers comprising ethylene n-butyl acrylate, ethylene methyl acrylate acid terpolymers, ethylene acrylic acid, ethylene methyl acrylate, zinc or sodium neutralized ethylene acid copolymers, ethylene vinyl acetate, and combinations of the foregoing.

Nothing with regard to these definitions is intended to be contrary to the generic definitions of these resins that are well known in the art. It should be noted, however, that LLDPE may refer to a blend of more than one LLDPE grade/type. Similarly, HDPE may refer to a blend of more than one HDPE grade/type, LDPE may refer to a blend of more than one LDPE grade/type, etc. Generally preferred ethylene polymers and copolymers that are useful include those sold by Exxon-Mobil Chemical Company in Houston Tex., including those sold as ExxonMobil HDPE, ExxonMobil LLDPE, and ExxonMobil LDPE; and those sold under the EXACT™, EXCEED™, ESCORENE™, EXXCO™, ESCOR™, ENABLE™, NTX™, PAXON™, and OPTEMA™ tradenames.

If any of the resins described herein is produced using a single-site catalyst, it may be (but is not necessarily) identified by the use of an initial lower case "m." For example, single-site catalyzed linear low density polyethylene manufactured in a gas phase reactor may be abbreviated "mLLDPE." As used herein, the term "single-site catalyzed polymer" refers to any polymer, copolymer, or terpolymer, and, in particular, any polyolefin polymerized using a single-site catalyst and is used interchangeably with the term "metallocene catalyzed polymer," wherein both "metallocene catalyzed polymer" and "single-site catalyzed polymer" are meant to include non-metallocene catalyzed single-site catalyzed polymers. As used herein, the term "Ziegler-Natta catalyzed polymer" refers to any polymer, copolymer, or terpolymer, and, in particular, any polyolefin polymerized using a Ziegler-Natta catalyst.

The LLDPE, HDPE, MDPE, LDPE, and DPE contemplated in certain embodiments include ethylene homopolymers and/or ethylene α-olefin copolymers. By "copolymers" is meant combinations of ethylene and one or more α-olefins. In general, the α-olefin comonomers can be selected from those having 3 to 20 carbon atoms, such as $C_3$-$C_{20}$ α-olefins or $C_3$-$C_{12}$ α-olefins. Suitable α-olefin comonomers can be linear or branched or may include two unsaturated carbon-carbon bonds (dienes). Two or more comonomers may be used, if desired. Examples of suitable comonomers include linear $C_3$-$C_{12}$ α-olefins and α-olefins having one or more $C_1$-$C_3$ alkyl branches or an aryl group. Particularly preferred comonomers are 1-butene, 1-hexene, and 1-octene. Specific comonomer examples include propylene; 1-butene; 3-methyl-1-butene; 3,3-dimethyl-1-butene; 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Specifically, the combinations of ethylene with a comonomer may include: ethylene 1-butene; ethylene 1-pentene; ethylene 4-methyl-1-pentene; ethylene 1-hexene; ethylene 1-octene; ethylene decene; ethylene dodecene; ethylene 1-butene 1-hexene; ethylene 1-butene 1-pentene; ethylene 1-butene 4-methyl-1-pentene; ethylene 1-butene 1-octene; ethylene 1-hexene 1-pentene; ethylene 1-hexene 4-methyl-1-pentene; ethylene 1-hexene 1-octene; ethylene 1-hexene decene; ethylene 1-hexene dodecene; ethylene propylene 1-octene; ethylene 1-octene 1-butene; ethylene 1-octene 1-pentene; ethylene 1-octene 4-methyl-1-pentene; ethylene 1-octene 1-hexene; ethylene 1-octene decene; ethylene 1-octene dodecene; combinations thereof and like permutations. It should be appreciated that the foregoing list of comonomers and comonomer combinations are merely exemplary and are not intended to be limiting.

If a comonomer is used, the monomer is generally polymerized in a proportion of from 50.0 to 99.9 wt % of monomer, preferably, from 70 to 99 wt % of monomer, and more preferably, from 80 to 98 wt % of monomer, with from 0.1 to 50 wt % of comonomer, preferably, from 1 to 30 wt % of comonomer, and more preferably, from 2 to 20 wt % of comonomer. For linear polyethylenes, the actual amount of comonomers, comonomer distribution along the polymer backbone, and comonomer branch length will generally define the density range.

LLDPE-HDPE Blends

In some embodiments, polymer blends include a LLDPE polymer and an HDPE polymer. A blend can include any of the inventive LLDPE polymers described herein, preferably, a metallocene-catalyzed LLDPE polymer, and, more preferably, a gas-phase produced metallocene-catalyzed LLDPE polymer. The blends can include any of the HDPE polymers described herein, preferably, a metallocene-catalyzed HDPE polymer, including those produced in gas phase, slurry, and/or solution processes.

The blends include at least 0.1 wt % and up to 99.9 wt % of the LLDPE polymer, and at least 0.1 wt % and up to 99.9 wt % of the HDPE polymer, with these wt % based on the total weight of the LLDPE and HDPE polymers of the blend. Alternative lower limits of the LLDPE polymer can be 5%, 10%, 20%, 30%, 40%, or 50% by weight. Alternative upper limits of the LLDPE polymer can be 95%, 90%, 80%, 70%, 60%, and 50% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the HDPE polymer component.

In one preferred embodiment, the polymer blend includes a LLDPE polymer or copolymer produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mole % of the hafnium compound. The LLDPE preferably has a comonomer content of up to about 5 mole %, a melt index $I_{2.16}$ of from about 0.1 to about 300 g/10 min, a melt index ratio of from about 15 to about 45, a weight average molecular weight of from about 20,000 to about 200,000, a molecular weight distribution of from about 2.0 to about 4.5, and a $M_z/M_w$ ratio of from about 1.7 to about 3.5. The blend further comprises an HDPE having a density greater than about 0.945 g/cm$^3$.

In any of these embodiments, the LLDPE polymer, the HDPE polymer, or both can be blends of such polymers. For example, the LLDPE polymer component of the blend can itself be a blend of two or more LLDPE polymers having the characteristics described herein, and alternatively or additionally, the HDPE polymer component of the blend can itself be a blend of two or more HDPE polymers having the characteristics described herein.

LLDPE-MDPE Blends

In some embodiments, polymer blends include a LLDPE polymer and a MDPE polymer. The blend can include any of the inventive LLDPE polymers described herein, preferably a metallocene-catalyzed LLDPE polymer, and more preferably a gas-phase produced metallocene-catalyzed LLDPE polymer. The blends may further include any of the MDPE polymers described herein, preferably a metallocene-catalyzed MDPE polymer, including those produced in gas phase, slurry, and/or solution processes.

The blends include at least 0.1 weight percent and up to 99.9 weight percent of the LLDPE polymer, and at least 0.1 weight percent and up to 99.9 weight percent of the MDPE polymer, with these weight percents based on the total weight of the LLDPE and MDPE polymers of the blend. Alternative lower limits of the LLDPE polymer can be 5%, 10%, 20%, 30%, 40%, or 50% by weight. Alternative upper limits of the LLDPE polymer can be 95%, 90%, 80%, 70%, 60%, and 50% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the MDPE polymer component.

In one preferred embodiment, the polymer blend includes a LLDPE polymer or copolymer produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mole % of the hafnium compound. The LLDPE preferably has a comonomer content of up to about 5 mole %, a melt index $I_{2.16}$ of from about 0.1 to about 300 g/10 min, a melt index ratio of from about 15 to about 45, a weight average molecular weight of from about 20,000 to about 200,000, a molecular weight distribution of from about 2.0 to about 4.5, and a $M_z/M_w$ ratio of from about 1.7 to about 3.5. The blend further comprises a MDPE having a density from about 0.930 g/cm$^3$ to about 0.945 g/cm$^3$.

In any of these embodiments, the LLDPE polymer, the MDPE polymer, or both, can be blends of such polymers. For example, the LLDPE polymer component of the blend can itself be a blend of two or more LLDPE polymers having the characteristics described herein, and alternatively or additionally, the MDPE polymer component of the blend can itself be a blend of two or more MDPE polymers having the characteristics described herein.

LLDPE-LDPE Blends

In some embodiments, polymer blends include a LLDPE polymer and a LDPE polymer. The blend can include any of the inventive LLDPE polymers described herein, preferably a metallocene-catalyzed LLDPE polymer, and more preferably a gas-phase produced metallocene-catalyzed LLDPE polymer. The blends can include any of the LDPE polymers described herein, including those produced in high pressure processes.

The blends include at least 0.1 weight percent and up to 99.9 wt % of the LLDPE polymer, and at least 0.1 wt % and up to 99.9 wt % of the LDPE polymer, with these wt % based on the total weight of the LLDPE and LDPE polymers of the blend. Alternative lower limits of the LLDPE polymer can be 5%, 10%, 20%, 30%, 40%, or 50% by weight. Alternative upper limits of the LLDPE polymer can be 95%, 90%, 80%, 70%, 60%, and 50% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the LDPE polymer component.

In one preferred embodiment, the polymer blend includes a LLDPE polymer or copolymer produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mole % of the hafnium compound. The LLDPE preferably has a comonomer content of up to about 5 mole %, a melt index $I_{2.16}$ of from about 0.1 to about 300 g/10 min, a melt index ratio of from about 15 to about 45, a weight average molecular weight of from about 20,000 to about 200,000, a molecular weight distribution of from about 2.0 to about 4.5, and a $M_z/M_w$ ratio of from about 1.7 to about 3.5. The blend further comprises a LDPE having a density between about 0.915 g/cm$^3$ to about 0.935 g/cm$^3$.

In any of these embodiments, the LLDPE polymer, the LDPE polymer, or both, can be blends of such polymers. For example, the LLDPE polymer component of the blend can itself be a blend of two or more LLDPE polymers having the characteristics described herein, and alternatively or additionally, the LDPE polymer component of the blend can itself be a blend of two or more LDPE polymers having the characteristics described herein.

LLDPE-LLDPE Blends

In some embodiments, polymer blends include a first LLDPE polymer and a second LLDPE polymer. The first LLDPE of the blend can include any of the inventive LLDPE polymers described herein, preferably a metallocene-catalyzed LLDPE polymer, and more preferably, a gas-phase produced metallocene-catalyzed LLDPE polymer. The second LLDPE of the blend can include any of the traditional LLDPE polymers described herein, preferably, a metallocene-catalyzed LLDPE polymer, including those produced in low pressure, gas phase, and/or slurry processes.

The blends include at least 0.1 wt % and up to 99.9 wt % of the first LLDPE polymer, and at least 0.1 wt % and up to 99.9 wt % of the second LLDPE polymer, with these weight percents based on the total weight of the first and second LLDPE polymers of the blend. Alternative lower limits of the first LLDPE polymer can be 5%, 10%, 20%, 30%, 40%, or 50% by weight. Alternative upper limits of the first LLDPE polymer can be 95%, 90%, 80%, 70%, 60%, and 50% by weight. Ranges from any lower limit to any upper limit are within the scope of the invention. Preferred blends include from 5-85%, alternatively from 10-50% or from 10-30% by weight of the first LLDPE polymer. The balance of the weight percentage is the weight of the second LLDPE polymer component.

In one preferred embodiment, the polymer blend includes a first LLDPE polymer or copolymer produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mole % of the hafnium compound. The first LLDPE preferably has a comonomer content of up to about 5 mole %, a melt index $I_{2.16}$ of from about 0.1 to about 300 g/10 min, a melt index ratio of from about 15 to about 45, a weight average molecular weight of from about 20,000 to about 200,000, a molecular weight distribution of from about 2.0 to about 4.5, and a $M_z/M_w$ ratio of from about 1.7 to about 3.5. The blend further comprises a second LLDPE having a density from about 0.910 to about 0.945 g/cm$^3$.

In any of these embodiments, the first LLDPE polymer, the second LLDPE polymer, or both, can be blends of such polymers. For example, the first LLDPE polymer component of the blend can itself be a blend of two or more inventive LLDPE polymers having the characteristics described herein, and alternatively or additionally, the second polymer component of the blend can itself be a blend of two or more traditional LLDPE polymers having the characteristics described herein.

In some embodiments, the second LLDPE polymer may comprise a copolymer of ethylene and at least one α-olefin having from 3 to about 20 carbon atoms which has a composition distribution breadth index (CDBI) of at least 70%, a melt index (MI), measured at 190° C. and 2.16 kg, of from about 0.1 to about 15 g/10 min, a density of from about 0.910 to about 0.945 g/cm$^3$, and a molecular weight distribution (MWD) of from about 2.5 to about 5.5, such as any of those LLDPE compositions or blends described in U.S. Provisional Application Ser. No. 60/798,382, filed May 5, 2006.

LLDPE-VLDPE Blends

In some embodiments, polymer blends include a LLDPE polymer and a VLDPE polymer. The blend can include any of the inventive LLDPE polymers described herein, preferably a metallocene-catalyzed LLDPE polymer, and more preferably a gas-phase produced metallocene-catalyzed LLDPE polymer. The blends can include any of the VLDPE polymers described herein, preferably a metallocene-catalyzed VLDPE polymer, including those produced in gas phase, slurry, and/or solution processes.

The blends include at least 0.1 wt % and up to 99.9 wt % of the LLDPE polymer, and at least 0.1 wt % and up to 99.9 wt % of the VLDPE polymer, with these weight percents based on the total weight of the LLDPE and VLDPE polymers of the blend. Alternative lower limits of the LLDPE polymer can be 5%, 10%, 20%, 30%, 40%, or 50% by weight. Alternative upper limits of the LLDPE polymer can be 95%, 90%, 80%, 70%, 60%, and 50% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the VLDPE polymer component.

In one preferred embodiment, the polymer blend includes a LLDPE polymer or copolymer produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mole % of the hafnium compound. The LLDPE preferably has a comonomer content of up to about 5 mole %, a melt index $I_{2.16}$ of from about 0.1 to about 300 g/10 min, a melt index ratio of from about 15 to about 45, a weight average molecular weight of from about 20,000 to about 200,000, a molecular weight distribution of from about 2.0 to about 4.5, and a $M_z/M_w$ ratio of from about 1.7 to about 3.5. The blend further comprises a VLDPE having a density less than about 0.915 g/cm$^3$.

In any of these embodiments, the LLDPE polymer, the VLDPE polymer, or both, can be blends of such polymers. For example, the LLDPE polymer component of the blend can itself be a blend of two or more LLDPE polymers having the characteristics described herein, and alternatively or additionally, the VLDPE polymer component of the blend can itself be a blend of two or more VLDPE polymers having the characteristics described herein.

LLDPE-DPE Blends

In some embodiments, polymer blends include a LLDPE polymer and a DPE polymer. The blend can include any of the inventive LLDPE polymers described herein, preferably a metallocene-catalyzed LLDPE polymer, and more preferably a gas-phase produced metallocene-catalyzed LLDPE polymer. Exemplary DPEs suitable for use in polymer blends include, but are not limited to, ethylene n-butyl acrylate, ethylene methyl acrylate acid terpolymers, ethylene acrylic acid, ethylene methyl acrylate, zinc or sodium neutralized ethylene acid copolymers, ethylene vinyl acetate, and combinations of the foregoing.

The blends include at least 0.1 wt % and up to 99.9 wt % of the LLDPE polymer, and at least 0.1 wt % and up to 99.9 wt % of the DPE polymer, with these weight percents based on the total weight of the LLDPE and DPE polymers of the blend. Alternative lower limits of the LLDPE polymer can be 5%, 10%, 20%, 30%, 40%, or 50% by weight. Alternative upper limits of the LLDPE polymer can be 95%, 90%, 80%, 70%, 60%, and 50% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the DPE polymer component.

In one preferred embodiment, the polymer blend includes a LLDPE polymer or copolymer produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mole % of the hafnium compound. The LLDPE preferably has a comonomer content of up to about 5 mole %, a melt index $I_{2.16}$ of from about 0.1 to about 300 g/10 min, a melt index ratio of from about 15 to about 45, a weight average molecular weight of from about 20,000 to about 200,000, a molecular weight distribution of from about 2.0 to about 4.5, and a $M_z/M_w$ ratio of from about 1.7 to about 3.5. The blend further comprises a DPE.

In any of these embodiments, the LLDPE polymer, the DPE polymer, or both, can be blends of such polymers. For example, the LLDPE polymer component of the blend can itself be a blend of two or more LLDPE polymers having the characteristics described herein, and alternatively or additionally, the DPE polymer component of the blend can itself be a blend of two or more DPE polymers having the characteristics described herein.

Other LLDPE Blends

In further embodiments, polymer blends include a LLDPE polymer and a second polymer. Use of the term "polymer" is meant to include copolymers and terpolymers. The blend can include any of the inventive LLDPE polymers described herein, preferably a LLDPE polymer or copolymer produced by gas-phase polymerization of ethylene and, optionally, an alpha-olefin with a catalyst having as a transition metal component a bis(n-$C_{3-4}$ alkyl cyclopentadienyl) hafnium compound. Other polymers that may be blended with the LLDPE include, but are not limited to, other ethylene-based polymers, propylene-based polymers, propylene ethylene copolymers, polymers derived from dienes, and combinations of the foregoing. For example, the inventive LLDPEs described herein may be blended with a polymer or polymers derived from conjugated and non-conjugated dienes, such as, for example, (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclooctadiene, tetracyclo-(δ-11,12)-5,8-dodecene, and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2,2,1)-hepta-2,5-diene; alkenyl, alkylidene, cycloalkenyl and cycloalkylidene norbornenes, such as 5-methylene-2-norbornene (MNB), 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Persons of ordinary skill in the art will recognize that a wide variety of polymers, including copolymers, terpolymers, and polymer blends may be blended with the inventive LLDPEs. Such additional blend components, though not particularly described herein, are within the scope and intended spirit of the invention.

The blends include at least 0.1 weight percent and up to 99.9 weight percent of the LLDPE polymer, and at least 0.1 weight percent and up to 99.9 weight percent of a second polymer, with these weight percents based on the total weight of the LLDPE and second polymers of the blend. Alternative lower limits of the LLDPE polymer can be 5%, 10%, 20%, 30%, 40%, or 50% by weight. Alternative upper limits of the LLDPE polymer can be 95%, 90%, 80%, 70%, 60%, and 50% by weight. Ranges from any lower limit to any upper limit are within the scope of the invention. Preferred blends include from 5-85%, alternatively from 10-50% or from 10-30% by weight of the LLDPE polymer. The balance of the weight percentage is the weight of the second polymer component.

In one preferred embodiment, the polymer blend includes a LLDPE polymer or copolymer produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mole % of the hafnium compound. The LLDPE preferably has a comonomer content of up to about 5 mole %, a melt index $I_{2.16}$ of from about 0.1 to about 300 g/10 min, a melt index ratio of from about 15 to about 45, a weight average molecular weight of from about 20,000 to about 200,000, a molecular weight distribution of from about 2.0 to about 4.5, and a $M_z/M_w$ ratio of from about 1.7 to about 3.5. The blend further comprises a second polymer.

In any of these embodiments, the LLDPE polymer, the second polymer, or both, can be blends of such polymers. For example, the LLDPE polymer component of the blend can itself be a blend of two or more LLDPE polymers having the characteristics described herein, and alternatively or additionally, the second polymer component of the blend can itself be a blend having the characteristics described herein.

Preparation of Blends

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates and hydrogenated rosins; UV stabilizers; heat stabilizers; anti-blocking agents; release agents; anti-static agents; pigments; colorants; dyes; waxes; silica; fillers; talc and the like.

End-Use Applications

Any of the foregoing LLDPE compositions or LLDPE blends may be used in a variety of end-use applications. Such applications include, for example, monolayer and multilayer blown, extruded, and/or cast stretch and/or shrink films; wire and cable coating compositions; articles formed by injection molding, blow molding, extrusion coating, foaming, and/or casting; and combinations thereof, each of which is described in more detail in the following paragraphs.

Polymers produced by the processes described herein are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

Films

LLDPE polymers and blends thereof may be utilized to prepare monolayer films or multilayer films. These films may be formed by any number of well known extrusion or coextrusion techniques discussed below. Films may be unoriented, uniaxially oriented or biaxially oriented. Physical properties of the film may vary depending on the film forming techniques used.

Multiple-layer films may be formed by methods well known in the art. The total thickness of multilayer films may vary based upon the application desired. A total film thickness of about 5-100 µm, more typically about 10-50 µm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes.

When used in multilayer films, the LLDPE polymer blends may be used in any layer of the film, or in more than one layer of the film, as desired. When more than one layer of the film is formed of a LLDPE polymer blend, each such layer can be individually formulated; i.e., the layers formed of the LLDPE polymer blend can be the same or different chemical composition, density, melt index, thickness, etc., depending upon the desired properties of the film.

To facilitate discussion of different film structures, the following notation is used herein. Each layer of a film is denoted "A" or "B", where "A" indicates a conventional film layer as defined below, and "B" indicates a film layer formed of any of the LLDPE polymers or blends. Where a film includes more than one A layer or more than one B layer, one or more prime symbols (', ", ''', etc.) are appended to the A or B symbol to indicate layers of the same type (conventional or inventive) that can be the same or can differ in one or more properties, such as chemical composition, density, melt index, thickness, etc. Finally, the symbols for adjacent layers are separated by a slash (/). Using this notation, a three-layer film having an inner layer of a LLDPE polymer blend disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film. The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 µm each and a B layer of 30 µm is denoted as 20/60/20.

For the various films described herein, the "A" layer can be formed of any material known in the art for use in multilayer films or in film-coated products. Thus, for example, each A layer can be formed of a polyethylene homopolymer or copolymer, and the polyethylene can be, for example, a VLDPE, a LDPE, a LLDPE, a MDPE, a HDPE, or a DPE, as well as other polyethylenes known in the art. The polyethylene can be produced by any suitable process, including metallocene-catalyzed processes and Ziegler-Natta catalyzed processes. Further, each A layer can be a blend of two or more such polyethylenes, and can include additives known in the art. Further, one skilled in the art will understand that the layers of a multilayer film must have the appropriate viscosity match.

In multilayer structures, one or more A layers can also be an adhesion-promoting tie layer, such as PRIMACOR™ ethylene-acrylic acid copolymers available from The Dow Chemical Company, and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and paper.

The "B" layer is formed of a LLDPE polymer or blend, and can be any of such blends described herein. In one embodiment, the B layer is formed of a blend of (a) from 0.1 to 99.9 wt % of a first polymer selected from the group consisting of very low density polyethylene, medium density polyethylene, differentiated polyethylene, and combinations thereof; and (b) from 99.9 to 0.1 wt % of a second polymer comprising a LLDPE polymer or copolymer produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mole % of the hafnium compound. The copolymer of (b) is preferably characterized by a comonomer content of up to about 5 mole %, a melt index $I_{2.16}$ of from about 0.1 to about 300 g/10 min, a melt index ratio of from about 15 to about 45, a weight average molecular weight of from about 20,000 to about 200,000, a molecular weight distribution of from about 2.0 to about 4.5, and a $M_z/M_w$ ratio of from about 1.7 to about 3.5. In preferred embodiments, the polymer of (a) is different from the polymer of (b).

The thickness of each layer of the film, and of the overall film, is not particularly limited, but is determined according to the desired properties of the film. Typical film layers have a thickness of from about 1 to about 1000 µm, more typically from about 5 to about 100 µm, and typical films have an overall thickness of from about 10 to about 100 µm.

In further applications, microlayer technology may be used to produce films with a large number of thinner layers. For example, microlayer technology may be used to obtain films having, for example, 24, 50, or 100 layers, in which the thickness of an individual layer is less than 1 µm. Individual layer thicknesses for these films may be less than 0.5 µm, less than 0.25 µm, or even less than 0.1 µm.

In one embodiment, LLDPE polymers and blends thereof may be utilized to prepare monolayer films, i.e., a film having a single layer which is a B layer as described above.

In other embodiments, using the nomenclature described above, multilayer films have any of the following exemplary structures: (a) two-layer films, such as A/B and B/B'; (b) three-layer films, such as A/B/A', A/A'/B, B/A/B' and B/B'/B"; (c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B"'; (d) five-layer films, such as A/A'/A"'/A"''/B, A/A'/A"/B/A"', A/A'/B/A"'/A"'', A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/B'/B"/A', B/A/A'/B'/B", B/A/B'/A'/B", B/A/B'/B"/A', A/B/B'/B"/B"', B/A/B'/B"/B"', B/B'/A/B"/B'", and B/B'/B"/B'"/B""; and similar structures for films having six, seven, eight, nine, twenty-four, forty-eight, sixty-four, one hundred, or any other number of layers. It should be appreciated that films having still more layers can be formed using the LLDPE polymers or blends, and such films are within the scope of the invention.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films composed of LLDPE polymer blends can also be used as coatings; e.g., films formed of the inventive polymers or polymer blends, or multilayer films including one or more layers formed of the inventive polymers or polymer blends, can be coated onto a substrate such as paper, metal, glass, plastic and other materials capable of accepting a coating. Such coated structures are also within the scope of the present invention.

As described below, the films can be cast films or blown films. The films can further be embossed, or produced or processed according to other known film processes. The films can be tailored to specific applications by adjusting the thickness, materials and order of the various layers, as well as the additives in or modifiers applied to each layer.

In one aspect, films containing the polymers and polymer blend compositions, monolayer or multilayer, may be formed by using casting techniques, such as a chill roll casting process. For example, a composition can be extruded in a molten state through a flat die and then cooled to form a film. As a specific example, cast films can be prepared using a cast film line machine as follows. Pellets of the polymer are melted at a temperature typically ranging from about 250° C. to about 300° C. for cast LLDPE resins (depending upon the particular resin used), with the specific melt temperature being chosen to match the melt viscosity of the particular resin layers. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically about 0.025 inches (about 600 μm). The material is then drawn down to the final gauge. The material draw down ratio is typically about 21:1 for 0.8 mil (20 μm) films. A vacuum box, edge pinners, air knife, or a combination of the foregoing can be used to pin the melt exiting the die opening to a primary chill roll maintained at about 80° F. (32° C.). The resulting polymer film is collected on a winder. The film thickness can be monitored by a gauge monitor, and the film can be edge trimmed by a trimmer. A typical cast line rate is from about 250 to about 2000 feet per minute. One skilled in the art will appreciate that higher rates may be used for similar processes such as extrusion coating. One or more optional treaters can be used to surface treat the film, if desired. Such chill roll casting processes and apparatus are well known in the art, and are described, for example, in The Wiley-Encyclopedia of Packaging Technology, Second Edition, A. L. Brody and K. S. Marsh, Ed., John Wiley and Sons, Inc., New York (1997). Although chill roll casting is one example, other forms of casting may be employed.

In another aspect, films containing the polymers and polymer blend compositions, monolayer or multilayer, may be formed using blown techniques, i.e., to form a blown film. For example, the composition can be extruded in a molten state through an annular die and then blown and cooled to form a tubular, blown film, which can then be axially slit and unfolded to form a flat film. As a specific example, blown films can be prepared as follows. The polymer blend composition is introduced into the feed hopper of an extruder, such as a 63.5 mm Egan extruder that is water-cooled, resistance heated, and has a L/D ratio of 24:1. The film can be produced using a 15.24 cm Sano die with a 2.24 mm die gap, along with a Sano dual orifice non-rotating, non-adjustable air ring. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from about 175° C. to about 225° C. Blown film rates are generally from about 5 to about 30 lbs per hour per inch of die circumference. The finished film can be wound into rolls for later processing, or can be fed into a bag machine and converted into bags. A particular blown film process and apparatus suitable for forming films according to embodiments described herein are described in U.S. Pat. No. 5,569,693. Of course, other blown film forming methods can also be used.

In one embodiment, films are composed of one or more LLDPE polymers that exhibit a melt index ratio of from about 20 to about 40, a molecular weight distribution ($M_w/M_n$) of from about 3.0 to about 4.0, a ratio of z-average molecular weight to weight average molecular weight of from about 2.2 to about 3.0, a $2^{nd}$ melt temperature of from about 119 to about 123, and a CDBI of from about 45 to about 75. Blown films having these characteristics are preferred. When normalized to 1 mil film thickness, films of these embodiments preferably exhibit a Dart (g) of from about 200 to about 1200, a tear MD (g) of from about 200 to about 1000, a tear TD (g) of from about 400 to about 1000. More preferably these films exhibit, a 1% secant mod. MD (kpsi) of from about 25 to about 35, a 1% secant mod. TD (kpsi) of from about 25 to about 35, a Tensile MD (psi) of from about 6000 to about 9000, and a Tensile TD (psi) of from about 5000 to about 8000.

In another aspect, provided are any polymer product containing the LLDPE polymer or polymer blend compositions produced by methods known in the art. In addition, also included are products having other specific end-uses, such as film-based products, which include stretch films, shrink films, bags (i.e., shipping sacks, trash bags and liners, industrial liners, and produce bags), flexible and food packaging (e.g., fresh cut produce packaging, frozen food packaging), personal care films, pouches, medical film products (such as IV bags), diaper backsheets and housewrap. Products may also include packaging, for example by bundling, packaging and unitizing a variety of products. Applications for such packaging include various foodstuffs, rolls of carpet, liquid containers and various like goods normally containerized and/or palletized for shipping, storage, and/or display.

In some embodiments, stretch cling films may be formed from the LLDPE polymers and polymer blends described herein. The stretch cling films may be monolayer or multilayer, with one or more layers comprising the LLDPE polymers or blends. In some embodiments, the films may be coextruded, comprising one or more layers made from the LLDPE polymers or blends described herein, along with one or more layers of traditional Ziegler-Natta or metallocene-catalyzed LLDPE, which may, optionally, include a comonomer such as, for example, hexene or octene.

Some resins and blends described herein may also be suited for use in stretch handwrap films. Stretch film handwrap requires a combination of excellent film toughness, especially puncture and dart drop performance, and a very stiff, i.e., difficult to stretch, film. This film 'stiffness' is required to minimize the stretch required to provide adequate load holding force to a wrapped load and to prevent further stretching of the film. The film toughness is required because handwrap loads (being wrapped) are typically more irregular and frequently contain greater puncture requirements than typical machine stretch loads. In some embodiments, the films may be downgauged stretch handwrap films. In further embodiments, LLDPE resins and blends may be blended with LDPE, other LLDPEs, or other polymers to obtain a material with characteristics suitable for use in stretch handwrap films.

Further product applications may also include surface protection applications, with or without stretching, such as in the temporary protection of surfaces during manufacturing, transportation, etc. There are many potential applications of articles and films produced from the polymer blend compositions described herein.

The LLDPE resins and blends prepared as described herein are also suited for the manufacture of blown film in a high-stalk extrusion process. In this process, a polyethylene melt is fed through a gap (typically 30-50 mm) in an annular die attached to an extruder and forms a tube of molten polymer which is moved vertically upward. The initial diameter of the molten tube is approximately the same as that of the annular die. Pressurized air is fed to the interior of the tube to maintain a constant air volume inside the bubble. This air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from approximately 0.5 to 2 mils and by a development of biaxial orientation in the film. The expanded tube is rapidly cooled (which induces crystallization of the polymer), collapsed between a pair of nip rolls and wound onto a film roll.

Two factors are useful to determine the suitability of a particular polyethylene resin or blend for high stalk extrusion: the maximum attainable rate of film manufacture and mechanical properties of the formed film. Adequate processing stability is desired at, for example, throughput rates of up to 15 lb/hr/inch die and high linespeeds (>200 ft/min) for thin gauge manufacture on modern extrusion equipment. Persons of skill in the art will recognize that varying throughput rates and linespeeds may be used without departing from the spirit of the present invention, and that the figures given herein are intended for illustrative purposes only. The resins and blends produced as described herein have molecular characteristics which allow them to be processed successfully at these high speeds. Mechanical strength of the film is different in two film directions, along the film roll (machine direction, MD) and in the perpendicular direction (transverse direction, TD). Typically, the TD strength in such films is significantly higher than their MD strength. The films manufactured from the resins prepared in the process of this invention with the catalysts described herein have a favorable balance of the MD and TD strengths.

Films composed of LLDPE polymers or blends thereof show improved performance and mechanical properties when compared to films previously known in the art. For example, films containing the LLDPE polymers and blends described herein have improved seal strength and hot tack performance, increased toughness, and lower reblock. The films also have a good balance of stiffness vs. toughness as indicated by machine direction tear strength, 1% secant modulus, and dart drop impact strength performance. In addition, such films may also exhibit higher ultimate stretch and have better processability when compared with other LLDPE resins and blends.

Blow Molded Articles

The resins and blends described herein are also suitable for use in blow molding processes. Such processes are well known in the art, and involve a process of inflating a hot, hollow thermoplastic preform (or parison) inside a closed mold. In this manner, the shape of the parison conforms to that of the mold cavity, enabling the production of a wide variety of hollow parts and containers.

In a typical blow molding process, a parison is formed between mold halves and the mold is closed around the parison, sealing one end of the parison and closing the parison around a mandrel at the other end. Air is then blown through the mandrel (or through a needle) to inflate the parison inside the mold. The mold is then cooled and the part formed inside the mold is solidified. Finally, the mold is opened and the molded part is ejected. The process lends itself to any design having a hollow shape, including but not limited to bottles, tanks, toys, household goods, automobile parts, and other hollow containers and/or parts.

Blow molding processes may include extrusion and/or injection blow molding. Extrusion blow molding is typically suited for the formation of items having a comparatively heavy weight, such as greater than about 12 ounces, including but not limited to food, laundry, or waste containers. Injection blow molding is typically used to achieve accurate and uniform wall thickness, high quality neck finish, and to process polymers that cannot be extruded. Typical injection blow molding applications include, but are not limited to, pharmaceutical, cosmetic, and single serving containers, typically weighing less than 12 ounces.

Rotational Molded Articles

The resins and blends described herein are also suitable for use in rotational molding processes. Rotational molding or rotational casting, more commonly known as rotomolding, is widely used for molding hollow articles, and can be used to mold both small and large containers, such as tanks of typically 19 L to 57,000 L. Such rotomolded tanks are utilized in agricultural, chemical, and recreational vehicle industries. Rotomolded containers are used for packaging and material handling, particularly as container articles for fluids, non-liquids or solids. Rotational molding is also used for portable toilets, instrument and battery cases, light globes, vacuum cleaner and scrubber housings, toys, and garbage containers. The process is relatively less expensive and easy to use for polymer processing than other known means and has been increasing in use.

To rotomold a part, polymeric resin, usually in powder, or micropellet form, or combinations thereof, is charged inside a mold shell, which is then typically rotated on two axes and heated to cause the melting resin to adhere to the inside of the mold. After sufficient heating time, the mold is moved to a cooling chamber, and after cooling, the molded part is removed to begin another molding cycle. More detailed discussion of rotomolding may be found in Modern Plastics Encyclopedia, 1990, pp. 317-318, and in Encyclopedia of Polymer Science and Engineering, pp. 659-670, J. Wiley & Sons, 1990.

Rotational molding primarily uses polyolefin resins, with thermoplastic polymers of ethylene being principally used. Key properties for rotomolded parts include appearance, and especially in the case of containers, resistance to puncture or rupture, chemical resistance and for extended periods of usefulness, resistance to environmental stress cracking. Low density polyethylene (LDPE) with a density of about 0.900 to about 0.925 g/cm$^3$, linear low density polyethylene (LLDPE) with a density of about 0.926 to about 0.940 g/cm$^3$, and high density polyethylene (HDPE) with a density of about 0.940 to about 0.960 g/cm³ are used in rotomolding applications. LLDPE is said to be preferred for its excellent low temperature impact strength and good environmental stress crack resistance ("ESCR").

Injection Molded Articles

In some embodiments, the presently described resins and blends may be used to form injection molded articles. Injection molding is a process commonly known in the art, and is a process that usually occurs in a cyclical fashion. Cycle times generally range from 10 to 100 seconds and are controlled by the cooling time of the polymer or polymer blend used.

In a typical injection molding cycle, polymer pellets or powder are fed from a hopper and melted in a reciprocating screw type injection molding machine. The screw in the machine rotates forward, filling a mold with melt and holding the melt under high pressure. As the melt cools in the mold and contracts, the machine adds more melt to the mold to compensate. Once the mold is filled, it is isolated from the injection unit and the melt cools and solidifies. The solidified part is ejected from the mold and the mold is then closed to prepare for the next injection of melt from the injection unit.

Injection molding processes offer high production rates, good repeatability, minimum scrap losses, and little to no need for finishing of parts. Injection molding is suitable for a wide variety of applications, including containers, household goods, automobile components, electronic parts, and many other solid articles.

Injection molded containers for non-food applications (pails, waste carts, trash containers, storage containers, etc.) have been historically injection molded from LLDPE and HDPE Ziegler-Natta catalyzed resins. It has been found that injection molding LLDPE and HDPE resins made from the inventive polymers and blends described herein dramatically improves balances of processability and physical properties when compared to Ziegler-Natta counterparts.

Thermoformed Articles

The resins and blends described herein are also suitable for use in thermoforming processes. Thermoforming is the process of forming a thermoplastic sheet into a three-dimensional shape by clamping the sheet in a frame, heating it to render it soft and pliable, then applying differential pressure to make the sheet conform to the shape of a mold or die positioned below the frame. When the pressure is applied entirely by vacuum, the process is called vacuum forming. When air pressure is employed to partially preform the sheet prior to application of vacuum, the process becomes air-assist vacuum forming.

In another variation, mechanical pressure is applied to a plug to partially preform the sheet (plug assist forming). In the drape forming modification, the softened sheet is lowered to drape over the high points of a male mold prior to application of vacuum. Still other modifications are: plug-and-ring forming—using a plug as the male mold and a ring matching the outside contour of the finished article; ridge forming—the plug is replaced with a skeleton frame; slip forming or air slip forming—the sheet is held in pressure pads which permit it to slip as forming progresses; or bubble forming—the sheet is blown by air into a blister and then pushed into a mold by means of a plug. The term thermoforming also includes methods employing only mechanical pressure, such as matched mold forming, in which the hot sheet is formed between registered male and female molds.

Extrusion Coating

The resins and blends described herein are also suitable for use in extrusion coating processes. Extrusion coating is a plastic fabrication process in which molten polymer is extruded and applied onto a non-plastic support, such as paper or aluminum in order to obtain a multi-material complex structure. This complex structure typically combines toughness, sealing and resistance properties of the polymer formulation with barrier, stiffness or aesthetics attributes of the non-polymer substrate. In this process, the substrate is typically fed from a roll into a molten polymer as the polymer is extruded from a slot die, which is similar to a cast film process. The resultant structure is cooled, typically with a chill roll or rolls, and wound into finished rolls.

Extrusion coating materials are typically used in food and non-food packaging, pharmaceutical packaging, and manufacturing of goods for the construction (insulation elements) and photographic industries (paper).

Foamed Articles

In some embodiments herein, the resins and blends described herein may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, electric, and manufacturing. Injection molded and rotational molded articles may be foamed as well.

Wire and Cable Applications

Other end use applications include electrical devices including one or more layers formed of or containing any of the LLDPE polymers or polymer blend compositions described herein. Such devices include, for example, power cables, telecommunications cables or data transmission cables, and combined power/telecommunications cables. As used herein, the terms "telecommunications cable" and "data cable" are used interchangeably. When the electrical device is a power cable, it can be a low voltage cable, i.e., a device adapted to transport electricity at a voltage potential of less than or equal to 1 kV or alternatively, less than or equal to 6 kV; a medium voltage cable, i.e., a device adapted to transport electricity at a voltage potential of from a lower limit of greater than 1 kV or greater than 6 kV to an upper limit of less than or equal to 35 kV or less than or equal to 66 kV; or a high voltage cable; i.e., a device adapted to transport electricity at a voltage potential of greater than 35 kV or greater than 66 kV. It should be appreciated that the designations "low voltage," "medium voltage," and "high voltage," as commonly used in the art, sometimes overlap; for example, a 4 kV cable is sometimes termed "low voltage" and sometimes termed "medium voltage." The range of suitable voltages, and in particular the upper voltage limit, can be used alternatively to characterize a power cable without resort to low/medium/high designations.

In any of the embodiments herein, the wire and/or cable coating compositions can be essentially the neat LLDPE resin or LLDPE blend, or can further include conventional additives, such as anti-oxidants, fillers, processing co-adjuvants, lubricants, pigments, and/or water-free retardant additives. Further, polymer blends are also contemplated, such as blends of the polymers and blends described herein that further comprise polyolefin homopolymers or copolymers, olefin-ester copolymers, polyesters, polyethers, polyether-polyester copolymers and mixtures thereof. Specific examples of polymers that can be included in such polymer mixtures include other polyethylenes, polypropylenes, propylene-ethylene thermoplastic copolymers, ethylene-propylene rubbers, ethylenepropylene-diene rubbers, natural rubbers, butyl rubbers, ethylene-vinyl acetate (EVA) copolymers, ethylene-methyl acrylate (EMA) copolymers, ethylene-ethyl acrylate (EEA) copolymers, ethylene-butyl acrylate (EBA) copolymers, and ethylene-α-olefin copolymers.

Suitable fillers include inorganic oxides, or inorganic oxides in hydrate or hydroxide form. Examples include oxides or hydroxides of aluminum, bismuth, cobalt, iron, magnesium, titanium and zinc, and the corresponding hydrate forms. Hydroxides are generally used in the form of coated particles, wherein the coating is typically a saturated or unsaturated $C_8$ to $C_{24}$ fatty acid or a salt thereof, such as, for example, oleic acid, palmitic acid, stearic acid, isostearic acid, lauric acid, magnesium stearate, magnesium oleate, zinc stearate, or zinc oleate. Other suitable fillers include glass particles, glass fibers, calcined kaolin and talc.

Typical antioxidants include, for example, polymerized trimethyldi-hydroquinoline, 4,4'-thiobis(3-methyl-6-tert-butyl)phenol; pentaerythryl-tetra[3-(3,5-ditert-butyl-4-hydroxyphenyl)propionate], and 2,2'-thiodiethylene-bis[3-(3,5-ditertbutyl-4-hydroxyphenyl)propionate].

Typical processing co-adjuvants include, for example, calcium stearate, zinc stearate, stearic acid, and paraffin wax.

Electrical devices described herein can be formed by methods well known in the art, such as by one or more extrusion coating steps in a reactor/extruder equipped with a cable die, and subsequent moisture cure. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

EXAMPLES

Test Methods

The properties cited below were determined in accordance with the following test procedures. Where any of these properties is referenced in the appended claims, it is to be measured in accordance with the specified test procedure.

Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Gauge, reported in mils, was measured using a Measuretech Series 200 instrument. The instrument measures film thickness using a capacitance gauge. For each film sample, ten film thickness datapoints were measured per inch of film as the film was passed through the gauge in a transverse direction. From these measurements, an average gauge measurement was determined and reported.

Elmendorf Tear, reported in grams (g) or grams per mil (g/mil), was measured as specified by ASTM D-1922.

Tensile Strength at Yield, reported in pounds per square inch ($lb/in^2$ or psi), was measured as specified by ASTM D-882.

Tensile Strength at Break, reported in pounds per square inch (lb/in or psi), was measured as specified by ASTM D-882.

Tensile Strength at 200% Elongation, reported in pounds per square inch ($lb/in^2$ or psi), was measured as specified by ASTM D-882.

Ultimate Tensile Strength, reported in pounds per square inch ($lb/in^2$ or psi), was measured as specified by ASTM D-882.

Tensile Peak Load, reported in pounds (lb), was measured as specified by ASTM D-882.

Tensile Energy, reported in inch-pounds (in-lb), was measured as specified by ASTM D-882.

Elongation at Yield, reported as a percentage (%), was measured as specified by ASTM D-882.

Elongation at Break, reported as a percentage (%), was measured as specified by ASTM D-882.

1% Secant Modulus (M), reported in pounds per square inch ($lb/in^2$ or psi), was measured as specified by ASTM D-882.

Haze, reported as a percentage (%), was measured as specified by ASTM D-1003.

Gloss, a dimensionless number, was measured as specified by ASTM D-2457 at 450.

Total Energy, reported in foot-pounds (ft-lb), was measured as specified by ASTM D-4272.

Melt Index, $I_{2.16}$, reported in grams per 10 minutes (g/10 min), refers to the melt flow rate measured according to ASTM D-1238, condition E.

High Load Melt Index, $I_{21.6}$, reported in grams per 10 minutes (g/10 min), refers to the melt flow rate measured according to ASTM D-1238, condition F.

Melt Index Ratio, a dimensionless number, is the ratio of the high load melt index to the melt index, or $I_{21.6}/I_{2.16}$.

100% Modulus, reported millipascals (mPa), was measured as specified by ASTM D-412.

300% Modulus, reported in millipascals (mPa), was measured as specified by ASTM D-412.

Density, reported in grams per cubic centimeter ($g/cm^3$), was determined using chips cut from plaques compression molded in accordance with ASTM D-1928 Procedure C, aged in accordance with ASTM D-618 Procedure A, and measured as specified by ASTM D-1505.

Dart $F_{50}$, or Dart Drop Impact or Dart Drop Impact Strength (DIS), reported in grams (g) and/or grams per mil (g/mil), was measured as specified by ASTM D-1709, method A.

Peak Puncture Force, reported in pounds (lb) and/or pounds per mil (lb/mil), was determined according to ASTM D-3763.

Puncture Break Energy, reported in inch-pounds (in-lb) and/or inch-pounds per mil (in-lb/mil), was determined according to ASTM D-3763.

Shrink, reported as a percentage, was measured by cutting circular specimens from a film using a 100 mm die. The samples were marked in their respective directions, dusted with talc, and placed on a pre-heated, talc covered tile. The samples were then heated using a heat gun (model HG-501A) for approximately 10 to 45 seconds, or until the dimensional change ceased. An average of three specimens is reported. A negative shrinkage number indicates expansion of a dimension after heating when compared to its pre-heating dimension.

Highlight Ultimate Stretch, reported as a percentage, and Highlight. Ultimate Stretch Force, reported in pounds (lb), were measured by a Highlight. Stretch tester using a method consistent with Highlight recommended machine settings and normal industry practices. Results are reported as an average of three tests unless otherwise noted.

Highlight Puncture Force, reported in pounds (lb), was measured by a Highlight Stretch tester using a method consistent with Highlight recommended machine settings. Results are reported as an average of two tests unless otherwise noted.

Coefficient of Friction, reported without units, was measured as specified by ASTM D-1894. Persons having ordinary skill in the art will recognize that, with respect to films, coefficient of friction may be measured in a number of configurations. Accordingly, such measurements will be designated as inside surface-to-inside surface (I/I), outside surface-to-inside surface (O/I), and outside surface-to-outside surface (O/O).

Izod Impact, reported in foot-pounds per inch, was determined according to ASTM D-4812.

Where any of the above properties are reported in pounds per square inch, grams per mil, or in any other dimensions that are reported per unit area or per unit thickness, the ASTM methods cited for each property have been followed except that the film gauge was measured in accordance with ASTM D-374, method C.

Resins Used in the Examples

Inventive LLDPE resins were prepared using the catalysts and gas phase processes described above. In particular, preparation of the inventive LLDPEs used in the following examples was substantially as described in the examples set forth in U.S. Pat. No. 6,956,088 B2, which is fully incorporated herein by reference. Process conditions were manipulated as needed to achieve resins having the resulting density and melt index measurements identified below.

Examples 1-16

LLDPE resins and selected commercial controls were evaluated for basic rheology, GPC, Crystaf, DSC Melting and structure data via proton NMR as given in Table 1. Controls were chosen to represent typical leading commercial LLDPE film grades.

TABLE 1

| | Example No. | | | | | | | |
|---|---|---|---|---|---|---|---|---|
| | 1 | 2 | 3 | 4 | 5 | 6 | 7 | 8 |
| Catalyst | Inventive | Inventive | Inventive | Inventive | Iventive | Inventive | Inventive | Inventive |
| Comonomer | Hexene | Hexene | Hexene | Hexene | Hexene | Hexene | Hexene | Hexene |
| Melt Index ($I_{2.16}$), g/10 min | 0.38 | 0.71 | 0.72 | 0.96 | 0.95 | 0.75 | 0.95 | 0.87 |
| High Load MI ($I_{21.6}$), g/10 min | 13.2 | 25.8 | 25.9 | 23.9 | 23.8 | 24.3 | 29.2 | 26.7 |
| Melt Index Ratio ($I_{21.6}/I_{2.16}$) | 34.7 | 36.3 | 36.0 | 24.9 | 25.1 | 32.4 | 30.7 | 30.7 |
| Density (g/cm$^3$) | 0.9176 | 0.9185 | 0.9214 | 0.9195 | 0.9222 | 0.9164 | 0.9209 | 0.9188 |
| $M_w$ | 147701 | 125505 | 128202 | 118493 | 115002 | 124041 | 117185 | 121425 |
| $M_n$ | 39834 | 34057 | 34062 | 36520 | 36392 | 34607 | 35168 | 32983 |
| $M_w/M_n$ | 3.71 | 3.69 | 3.76 | 3.24 | 3.16 | 3.58 | 3.33 | 3.68 |
| $M_z$ | 427491 | 357107 | 363008 | 306660 | 287406 | 329683 | 311674 | 328554 |
| $M_z/M_w$ | 2.89 | 2.85 | 2.83 | 2.59 | 2.50 | 2.66 | 2.66 | 2.71 |
| DSC $2^{nd}$ melt (° C.) | 121.9 | 122.6 | 122.2 | 120.5 | 121.0 | 121.4 | 121.9 | 121.2 |
| DSC ΔH (J/g) | 126 | 128 | 129 | 127 | 130 | 122 | 132 | 125 |
| DSC Tc (° C.) | 109.3 | 109.6 | 111.8 | 108.1 | 109.9 | 108.6 | 109.4 | 108.6 |
| 1H NMR Data | | | | | | | | |
| Me/1000 C. | 16 | 17 | 17 | 15 | 14.6 | 18.1 | 15 | 16.4 |
| wt % $C_6$ | 9.8 | 10.2 | 10.3 | 8.8 | 8.8 | 10.9 | 9.1 | 9.8 |
| mol % $C_6$ | 3.5 | 3.6 | 3.7 | 3.1 | 3.1 | 3.9 | 3.2 | 3.5 |
| vinylenes/1000 C. | 0.05 | 0.04 | | 0.04 | | 0.04 | 0.04 | 0.06 |
| trisubs/1000 C. | 0.09 | 0.05 | | 0.06 | | 0.11 | 0.06 | 0.11 |
| vinyls/1000 C. | 0.01 | 0.01 | | 0.00 | | 0.02 | 0.01 | 0.02 |
| vinylidenes/1000 C. | 0.02 | 0.01 | | 0.01 | | 0.02 | 0.00 | 0.01 |
| Total unsats/1000 C. | 0.17 | 0.11 | | 0.11 | | 0.19 | 0.11 | 0.20 |

| | Example No. | | | | | | | |
|---|---|---|---|---|---|---|---|---|
| | 9 | 10 | 11 | 12 | 13 | 14 | 15 | 16 |
| Catalyst | Inventive | Inventive | Inventive | Ziegler-Natta | Ziegler-Natta | Traditional Metallocene | Inventive | Inventive |
| Comonomer | Hexene | Hexene | Hexene | Octene | Hexene | Hexene | Hexene | Hexene |
| Melt Index ($I_{2.16}$), g/10 min | 0.97 | 0.59 | 0.69 | 0.58 | 1.00 | 0.96 | 0.65 | 0.66 |
| High Load MI ($I_{21.6}$), g/10 min | 24.3 | 20.35 | 17.3 | 18.3 | 25.5 | 15.6 | 18.9 | 19.3 |
| Melt Index Ratio ($I_{21.6}/I_{2.16}$) | 25.1 | 34.5 | 25.1 | 31.6 | 25.5 | 16.3 | 29.1 | 29.2 |
| Density (g/cm$^3$) | 0.9176 | 0.9226 | 0.9205 | 0.9203 | 0.9226 | 0.9197 | 0.9195 | 0.9229 |
| $M_w$ | 112665 | 142472 | 133352 | | 129335 | | 129173 | 132068 |
| $M_n$ | 35957 | 39952 | 43327 | | 36815 | | 45901 | 43869 |
| $M_w/M_n$ | 3.13 | 3.57 | 3.08 | | 3.51 | | 2.81 | 3.01 |
| $M_z$ | 257518 | 376964 | 301619 | | 368788 | | 307338 | 330744 |
| $M_z/M_w$ | 2.29 | 2.65 | 2.26 | | 2.85 | | 2.38 | 2.50 |
| DSC $2^{nd}$ melt (° C.) | 119.7 | 122.4 | 120.5 | | | | 122.6 | 123.1 |
| DSC ΔH (J/g) | 125 | 131 | 126 | | | | 121 | 128 |

TABLE 1-continued

| | | | | | | |
|---|---|---|---|---|---|---|
| DSC Tc (° C.) | 106.9 | 116.0 | 109.4 | | 110.0 | 112.0 |
| 1H NMR Data | | | | | | |
| Me/1000 C. | 16.1 | 15.2 | 15.0 | | 15.7 | 15.5 |
| wt % $C_6$ | 9.7 | 9.1 | 9.0 | | 9.4 | 9.3 |
| mol % $C_6$ | 3.4 | 3.2 | 3.2 | | 3.3 | 3.3 |
| vinylenes/1000 C. | 0.06 | | | | 0.05 | |
| trisubs/1000 C. | 0.15 | | | | 0.10 | |
| vinyls/1000 C. | 0.03 | | | | 0.01 | |
| vinylidenes/1000 C. | 0.01 | | | | 0.01 | |
| Total unsats/1000 C. | 0.25 | | | | 0.17 | |

Examples 17-23

A range of inventive resins and selected controls from Table 1 were processed into blown films on a Sano Blown Film Line. The film line had a 3½ inch extruder with barrier screw, 10 inch diameter die, 60 mil die gap, and a dual lip air ring with chilled air at approximately 50° F. The Sano was operated at nominal conditions of 315 lbs per hour with a 28 inch frost line height, and a 2.5 blow up ratio (BUR) producing 0.75 mil films. A detailed summary of film extrusion conditions is included with the film data in Table 2.

TABLE 2

| | Example No. | | | | | | |
|---|---|---|---|---|---|---|---|
| | 17 | 18 | 19 | 20 | 21 | 22 | 23 |
| Catalyst | Inventive | Inventive | Inventive | Inventive | Inventive | Ziegler-Natta | Inventive |
| Comonomer | Hexene | Hexene | Hexene | Hexene | Hexene | Octene | Hexene |
| Melt Index ($I_{2.16}$), g/10 min | 0.38 | 0.72 | 0.72 | 0.72 | 0.59 | 0.58 | 0.66 |
| High Load MI ($I_{21.6}$), g/10 min | 13.2 | 25.9 | 25.9 | 25.9 | 20.4 | 18.3 | 19.3 |
| Melt Index Ratio ($I_{21.6}/I_{2.16}$) | 34.7 | 36.0 | 36.0 | 36.0 | 34.6 | 31.6 | 29.2 |
| Density (g/cm$^3$) | 0.9176 | 0.9214 | 0.9214 | 0.9214 | 0.9226 | 0.9203 | 0.9229 |
| Melt Temperature (° F.) | 447 | 399 | 400 | 396 | 405 | 435 | 403 |
| Output (lb/h) | 318 | 314 | 325 | 298 | 319 | 311 | 302 |
| Head Pressure (psi) | 5130 | 3800 | 3910 | 3910 | 3980 | 4580 | 4070 |
| Extruder HP | 46 | 40 | 41 | 38 | 45 | 43 | 43 |
| Screw Speed (rpm) | 46.7 | 44.7 | 44.6 | 43.5 | 46.8 | 47.7 | 45.2 |
| Line Speed (fpm) | 219 | 218 | 219 | 219 | 219 | 210 | 219 |
| Gauge (mils) | 0.76 | 0.75 | 0.75 | 0.71 | 0.73 | 0.78 | 0.72 |
| FLH (in) | 29 | 26 | 28 | 28 | 29 | 31 | 29 |
| Tensile at Yield, MD (psi) | | 1300 | 1280 | 1250 | 1370 | 1210 | 1350 |
| Tensile at Yield, TD (psi) | 1390 | 1330 | 1380 | 1360 | 1500 | 1250 | 1340 |
| Ultimate Tensile, MD (psi) | 7820 | 9320 | 8600 | 7370 | 8150 | 7350 | 7160 |
| Ultimate Tensile, TD (psi) | 5070 | 6420 | 5320 | 4400 | 4960 | 4480 | 5860 |
| Ultimate Elongation, MD (%) | | 330 | 320 | 300 | 310 | 330 | 330 |
| Ultimate Elongation, TD (%) | 500 | 570 | 540 | 500 | 540 | 530 | 530 |
| 1% Secant Modulus, MD (psi) | 24030 | 25260 | 25240 | | 28120 | 23540 | 26350 |
| 1% Secant Modulus, TD (psi) | 29050 | 28560 | 29060 | | 31465 | 27510 | 29320 |
| Puncture Force (lbs/mil) | 8.4 | 12.6 | 9.8 | 8.2 | 8.4 | 5.6 | 10.6 |
| Puncture Energy (in · lb/mil) | 14.3 | 31.4 | 19.2 | 13.5 | 13.1 | 8.7 | 21.9 |
| Elmendorf Tear, MD (g/mil) | 440 | 440 | 440 | 500 | 500 | 520 | 460 |
| Elmendorf Tear, TD (g/mil) | 480 | 490 | 510 | 530 | 560 | 860 | 450 |
| MD/TD | 0.92 | 0.90 | 0.86 | 0.94 | 0.89 | 0.60 | 1.02 |
| Dart Drop (g) | 280 | 390 | 290 | 250 | 330 | 370 | 490 |
| Dart Drop per mil | 380 | 520 | 380 | 350 | 460 | 490 | 670 |
| Gauge (mils) | 0.73 | 0.75 | 0.77 | 0.7 | 0.73 | 0.76 | 0.73 |
| Shrink, MD (%) | 75 | 74 | 74 | 76 | 75 | 73 | 74 |
| Shrink, TD (%) | −5 | −7 | −6 | −6 | −9 | −7 | −13 |
| Coefficient of Friction, Static (I/I) | 0.93 | 0.27 | 0.28 | 0.43 | 0.37 | 0.28 | 0.35 |
| Coefficient of Friction, Kinetic (I/I) | 0.80 | 0.25 | 0.26 | 0.39 | 0.33 | 0.28 | 0.32 |

Films are frequently compared based on their balance of toughness vs. stiffness. As shown in Table 2, the inventive films have stiffness (as indicated by 1% Secant Modulus) that averages 10% higher than that of the control (Example 22). The toughness of the inventive films is superior, as evidenced by every inventive film having higher puncture force and puncture energy than the control. The inventive films also had excellent tensile strength values, as much as 30% higher than the control. The inventive samples also had good processing, with 30° F. lower melt temperature and 15% lower extruder head pressure than the control. This combination of improved toughness vs. stiffness balance and easier processing is valued in many film applications.

Examples 25-36

A range of inventive resins and selected controls from Table 1 were processed into blown films on a GEC Blown Film Line. The GEC line has 2½ inch extruder with barrier screw, 6 inch diameter die, 60 mil die gap, and dual lip air ring with chilled air at approximately 50° F. For this run, the GEC was operated at nominal conditions of 180 lbs per hour with a 2.5 blow up ratio (BUR) producing 0.75 mil films. A detailed summary of film extrusion conditions is included with the film data in Table 3.

TABLE 3

| | Example No. | | | | | | |
|---|---|---|---|---|---|---|---|
| | 24 | 25 | 26 | 27 | 28 | 29 | 30 |
| Catalyst | Inventive | Inventive | Inventive | Inventive | Inventive | Inventive | Inventive |
| Comonomer | Hexene | Hexene | Hexene | Hexene | Hexene | Hexene | Hexene |
| Melt Index ($I_{2.16}$), g/10 min | 0.71 | 0.96 | 0.75 | 0.95 | 0.87 | 0.87 | 0.87 |
| High Load MI ($I_{21.6}$), g/10 min | 25.8 | 23.9 | 24.3 | 29.2 | 26.7 | 26.7 | 26.7 |
| Melt Index Ratio ($I_{21.6}/I_{2.16}$) | 36.3 | 24.9 | 32.4 | 30.7 | 30.7 | 30.7 | 30.7 |
| Density (g/cm$^3$) | 0.9185 | 0.9195 | 0.9164 | 0.9209 | 0.9188 | 0.9188 | 0.9188 |
| Melt Temperature (° F.) | 395 | 396 | 395 | 393 | 396 | 396 | 396 |
| Output (lb/h) | 186 | 191 | 188 | 189 | 190 | 188 | 190 |
| Head Pressure (psi) | 3710 | 3570 | 3780 | 3410 | 3550 | 3560 | 3730 |
| Die Pressure (psi) | 2500 | 2390 | 2540 | 2290 | 2380 | 2370 | 2370 |
| Extruder Motor Load (amps) | 62.4 | 65.8 | 64.1 | 62.5 | 63.1 | 63.4 | 63.8 |
| Extruder Screw Speed (rpm) | 58.9 | 59.9 | 58.9 | 58.9 | 59.4 | 57.7 | 60.5 |
| Line Speed (fpm) | 230 | 230 | 230 | 230 | 230 | 230 | 230 |
| Film Gauge (mils) | 0.76 | 0.74 | 0.76 | 0.75 | 0.75 | 0.74 | 0.75 |
| FLH (in) | 19 | 22 | 19 | 22 | 22 | 22 | 22 |
| Tensile at Yield, MD (psi) | 1380 | 1390 | 1320 | 1450 | 1650 | 1330 | 1280 |
| Tensile at Yield, TD (psi) | 1510 | 1460 | 1380 | 1600 | 1480 | 1410 | 1350 |
| Ultimate Tensile, MD (psi) | 8460 | 7590 | 8800 | 7870 | 7420 | 8270 | 8210 |
| Ultimate Tensile, TD (psi) | 6540 | 6660 | 6650 | 6770 | 6790 | 6490 | 3920 |
| Ultimate Elongation, MD (%) | 260 | 320 | 280 | 310 | 300 | 310 | 300 |
| Ultimate Elongation, TD (%) | 610 | 590 | 600 | 630 | 610 | 600 | 510 |
| 1% Secant Modulus, MD (psi) | 27370 | 26310 | 24180 | 28990 | 26230 | 25650 | 25020 |
| 1% Secant Modulus, TD (psi) | 35110 | 31920 | 30610 | 38460 | 33890 | 30430 | 29820 |
| Puncture Force (lbs/mil) | 16.5 | 16.2 | 16.4 | 12.3 | 13.8 | 10.3 | 5.3 |
| Puncture Energy (in · lb/mil) | 46.8 | 48.4 | 45.2 | 32.2 | 39.9 | 26.3 | 6.7 |
| Elmendorf Tear, MD (g/mil) | 640 | 550 | 610 | 710 | 610 | 590 | 580 |
| Elmendorf Tear, TD (g/mil) | 620 | 540 | 540 | 550 | 560 | 590 | 590 |
| Elmendorf Tear, MD/TD Ratio | 1.03 | 1.02 | 1.13 | 1.29 | 1.09 | 1.00 | 0.98 |
| Dart Drop (g) | 550 | 450 | 560 | 350 | 500 | 330 | 260 |
| Dart Drop per mil | 760 | 620 | 770 | 480 | 680 | 420 | 330 |
| Gauge (mils) | 0.71 | 0.72 | 0.73 | 0.73 | 0.74 | 0.78 | 0.79 |
| Shrink, MD (%) | 79 | 72 | 76 | 74 | 74 | 72 | 74 |
| Shrink, TD (%) | −27 | −20 | −24 | −21 | −23 | −22 | −22 |
| Reblock (g) | 17 | 13 | 46 | 14 | 21 | 6.2 | 4.6 |
| Haze (%) | 37 | 30 | 25 | 27 | 33 | 35 | 79 |
| Gloss | 19 | 25 | 29 | 18 | | 25 | 18 |
| Coefficient of Friction, Static (I/I) | | | | | | 0.33 | 0.42 |
| Coefficient of Friction, Kinetic (I/I) | | | | | | 0.30 | 0.39 |
| Tensile Rechecks | | | | | | | |
| Tensile at Yield, MD (psi) | 1390 | 1400 | 1320 | 1480 | 1390 | 1380 | 1350 |
| Tensile at Yield, TD (psi) | 1510 | 1460 | 1390 | 1630 | 1500 | 1480 | 1440 |
| Ultimate Tensile, MD (psi) | 10480 | 9270 | 10220 | 9530 | 9400 | 9580 | 8170 |
| Ultimate Tensile, TD (psi) | 6400 | 7090 | 7180 | 7160 | 7490 | 6190 | 4490 |
| Ultimate Elongation, MD (%) | 290 | 350 | 290 | 330 | 320 | 330 | 310 |
| Ultimate Elongation, TD (%) | 610 | 620 | 620 | 650 | 630 | 590 | 530 |

| | Example No. | | | | | |
|---|---|---|---|---|---|---|
| | 31 | 32 | 33 | 34 | 35 | 36 |
| Catalyst | Inventive | Ziegler-Natta | Ziegler-Natta | Ziegler-Natta | Traditional Metallocene | Inventive |
| Comonomer | Hexene | Hexene | Hexene | Hexene | Hexene | Hexene |
| Melt Index ($I_{2.16}$), g/10 min | 0.97 | 1.00 | 1.00 | 1.00 | 0.96 | 0.65 |
| High Load MI ($I_{21.6}$), g/10 min | 24.3 | 25.5 | 25.5 | 25.5 | 15.6 | 18.9 |
| Melt Index Ratio ($I_{21.6}/I_{2.16}$) | 25.1 | 25.5 | 25.5 | 25.5 | 16.3 | 29.1 |

TABLE 3-continued

| | | | | | | |
|---|---|---|---|---|---|---|
| Density (g/cm³) | 0.9176 | 0.9226 | 0.9226 | 0.9226 | 0.9197 | 0.9195 |
| Melt Temperature (° F.) | 395 | 430 | 429 | 397 | 401 | 398 |
| Output (lb/h) | 192 | 191 | 188 | 188 | 189 | 187 |
| Head Pressure (psi) | 3590 | 3550 | 3410 | 3900 | 3880 | 4110 |
| Die Pressure (psi) | 2350 | 2260 | 2170 | 2500 | 2490 | 2730 |
| Extruder Motor Load (amps) | 63.6 | 62.5 | 59.3 | 66.3 | 71.3 | 69.9 |
| Extruder Screw Speed (rpm) | 60.9 | 56.9 | 58.4 | 61.0 | 59.4 | 58.9 |
| Line Speed (fpm) | 230 | 230 | 230 | 230 | 227 | 227 |
| Film Gauge (mils) | 0.72 | 0.78 | 0.75 | 0.74 | 0.76 | 0.76 |
| FLH (in) | 22 | 32 | 32 | 22 | 24 | 20 |
| Tensile at Yield, MD (psi) | 1270 | 1260 | 1250 | 1260 | 1370 | 1430 |
| Tensile at Yield, TD (psi) | 1300 | 1260 | 1240 | 1300 | 1370 | 1580 |
| Ultimate Tensile, MD (psi) | 8970 | 7360 | 7020 | 7860 | 8620 | 8370 |
| Ultimate Tensile, TD (psi) | 7390 | 5440 | 4500 | 4390 | 7170 | 7500 |
| Ultimate Elongation, MD (%) | 340 | 450 | 430 | 400 | 390 | 270 |
| Ultimate Elongation, TD (%) | 610 | 660 | 610 | 600 | 590 | 650 |
| 1% Secant Modulus, MD (psi) | 22450 | 22620 | 22420 | 24730 | 24250 | 30470 |
| 1% Secant Modulus, TD (psi) | 26690 | 24780 | 24630 | 25000 | 27650 | 35910 |
| Puncture Force (lbs/mil) | 14.0 | 7.3 | 3.9 | 4.0 | 16.8 | 13.4 |
| Puncture Energy (in · lb/mil) | 40.6 | 17.2 | 5.5 | 5.5 | 53.3 | 38.4 |
| Elmendorf Tear, MD (g/mil) | 390 | 440 | 530 | 530 | 290 | 760 |
| Elmendorf Tear, TD (g/mil) | 510 | 760 | 780 | 920 | 510 | 650 |
| Elmendorf Tear, MD/TD Ratio | 0.76 | 0.58 | 0.68 | 0.58 | 0.57 | 1.17 |
| Dart Drop (g) | 700 | 140 | 280 | 180 | 370 | 400 |
| Dart Drop per mil | 940 | 170 | 350 | 220 | 510 | 540 |
| Gauge (mils) | 0.74 | 0.84 | 0.79 | 0.8 | 0.73 | 0.73 |
| Shrink, MD (%) | 69 | 64 | 66 | 68 | 58 | 77 |
| Shrink, TD (%) | −19 | −15 | −19 | −19 | −12 | −26 |
| Reblock (g) | 21 | 48 | 31 | 29 | 15 | 25 |
| Haze (%) | 26 | 29 | 77 | 78 | 20 | 28 |
| Gloss | 22 | 21 | 22 | 24 | 34 | 32 |
| Coefficient of Friction, Static (I/I) | | 0.13 | 0.19 | 0.16 | | |
| Coefficient of Friction, Kinetic (I/I) | | 0.12 | 0.17 | 0.15 | | |
| Tensile Rechecks | | | | | | |
| Tensile at Yield, MD (psi) | 1300 | 1250 | 1270 | 1300 | 1350 | 1440 |
| Tensile at Yield, TD (psi) | 1340 | 1310 | 1270 | 1320 | 1390 | |
| Ultimate Tensile, MD (psi) | 9780 | 8240 | 6690 | 8490 | 10310 | 10400 |
| Ultimate Tensile, TD (psi) | 7510 | 5570 | 4410 | 4490 | 6920 | |
| Ultimate Elongation, MD (%) | 360 | 500 | 460 | 390 | 440 | 300 |
| Ultimate Elongation, TD (%) | 610 | 670 | 600 | 610 | 580 | |

Films are frequently compared based on their balance of toughness vs. stiffness. For the results in Table 3, the films of Examples 32-34 (controls) have excellent tear strength, but the dart impact strength is lower than most other films. The resin used in Example 35 (another control) is a mLLDPE that is known for its excellent dart and puncture performance, but its tear strength is lower than Examples 32-34 and can limit its performance in use. The inventive films offer an excellent and much improved tear/impact/stiffness balance that exceeds the individual performance of either control resin. For example, the inventive film of Example 36 has approximately 20% higher stiffness, equivalent dart and tensile strength, and more than double the MD tear strength of the control resin of Example 35. The inventive films' MD tear is typically more than 100 grams/mil higher than the highest tear control. This outstanding toughness/stiffness, along with good processing characteristics, as shown in Table 3 shows that the inventive films provide much improved performance capability.

Examples 37-45

LLDPE resins and selected commercial controls were evaluated for basic rheology, GPC, Crystaf, DSC Melting and composition data via proton NMR as given in Table 4. Controls were intentionally chosen to represent typical leading commercial LLDPE film grades.

TABLE 4

| | Example No. | | | | | | | | |
|---|---|---|---|---|---|---|---|---|---|
| | 37 | 38 | 39 | 40 | 41 | 42 | 43 | 44 | 45 |
| Catalyst | Inventive | Inventive | Inventive | Inventive | Inventive | Inventive | Traditional Metallocene | Ziegler-Natta | Traditional Metallocene |
| Comonomer | Hexene | Hexene | Hexene | Hexene | Hexene | Hexene | Hexene | Hexene | Hexene |
| Melt Index ($I_{2.16}$), g/10 min | 0.79 | 0.84 | 0.75 | 0.86 | 0.85 | 0.99 | 1.07 | 0.947 | 1.07 |
| High Load MI ($I_{21.6}$), g/10 min | 27.3 | 27.7 | 24.6 | 26.2 | 27.8 | 29.4 | 16.9 | 24.4 | 17.9 |
| Melt Index Ratio ($I_{21.6}/I_{2.16}$) | 34.6 | 33.0 | 32.8 | 30.5 | 32.7 | 29.7 | 15.8 | 25.8 | 16.7 |
| Density (g/cm³) | 0.9184 | 0.9178 | 0.9151 | 0.9181 | 0.9184 | 0.9195 | 0.9195 | 0.9218 | 0.9144 |
| $M_w$ | 127333 | 126538 | 131515 | 124917 | 126621 | 121347 | 109478 | 126901 | 111418 |

TABLE 4-continued

| | Example No. | | | | | | | | |
|---|---|---|---|---|---|---|---|---|---|
| | 37 | 38 | 39 | 40 | 41 | 42 | 43 | 44 | 45 |
| $M_n$ | 34504 | 32286 | 32086 | 34549 | 33241 | 35333 | 43767 | 32985 | 46175 |
| $M_w/M_n$ | 3.69 | 3.92 | 4.10 | 3.62 | 3.81 | 3.43 | 2.50 | 3.85 | 2.41 |
| $M_z$ | 334483 | 325886 | 335746 | 315872 | 328884 | 306459 | 201398 | 359094 | 206303 |
| $M_z/M_w$ | 2.63 | 2.58 | 2.55 | 2.53 | 2.60 | 2.53 | 1.84 | 2.83 | 1.85 |
| CRYSTAF Data (operated using cryo procedure) | | | | | | | | | |
| % Soluble | 0.7 | 0.4 | 0.4 | 0.3 | 0.4 | 0.7 | 0.1 | 4.2 | 0.6 |
| % HD | 63 | 47 | 48 | 49 | 48 | | | | |
| Split (% LD + sol:% HD) | 37:63 | 53:47 | 52:48 | 51:49 | 52:48 | | | | |
| % Tc < 70 C. | 52.3 | 59.7 | 66.5 | 58.3 | 58.4 | 52.6 | 55.2 | 53.1 | 80.5 |
| % Tc > 70 C. | 47.0 | 39.9 | 33.1 | 41.4 | 41.2 | 46.7 | 44.7 | 42.7 | 18.9 |
| Tc HD | 79.6 | 79.1 | 77.6 | 79.2 | 79.0 | | | | |
| Tc LD | 36.1 | 42.9 | 37.9 | 45.2 | 44.7 | | | | |
| Spread (C.) | 43.5 | 36.2 | 39.7 | 34 | 34.3 | 0 | | | |
| DSC Data | | | | | | | | | |
| 2nd melt (° C.) | 122.7 | 121.6 | 120.1 | 122.1 | 121.3 | 122.0 | 118.6 | 124.2 | 115.6 |
| ΔH (J/g) | 123 | 122 | 117 | 122 | 125 | 126 | 131 | 121 | 120 |
| $T_c$ | 109.9 | 109.4 | 108.0 | 108.7 | 108.9 | 109.2 | 105.0 | 113.8 | 102.2 |
| Proton NMR Data | | | | | | | | | |
| Me/1000 C. | 16.8 | 17.1 | 19.3 | 16.0 | 16.4 | 15.9 | 11.5 | 18.4 | 16.3 |
| wt % $C_6$ | 10.1 | 10.3 | 11.6 | 9.6 | 9.9 | 9.5 | 6.9 | 11.0 | 9.8 |
| mol % $C_6$ | 3.6 | 3.7 | 4.2 | 3.4 | 3.5 | 3.4 | 2.4 | 4 | 3.5 |
| vinylenes/1000 C. | 0.05 | 0.03 | 0.02 | 0.01 | 0.04 | 0.03 | 0.01 | 0.07 | 0.03 |
| trisubs/1000 C. | 0.09 | 0.04 | 0.02 | 0.05 | 0.13 | 0.11 | 0.06 | 0.09 | 0.05 |
| vinyls/1000 C. | 0.01 | 0.01 | 0.00 | 0.00 | 0.03 | 0.01 | 0.07 | 0.14 | 0.07 |
| vinylidenes/1000 C. | 0.01 | 0.03 | 0.00 | 0.00 | 0.06 | 0.05 | 0.03 | 0.05 | 0.06 |
| Total unsats/1000 C. | 0.16 | 0.11 | 0.04 | 0.06 | 0.26 | 0.20 | 0.17 | 0.35 | 0.21 |

Examples 46-52

Inventive resins and controls were processed into blown films on a 2.5 inch Gloucester Blown Film Line at a 2.5 blow-up ratio using a 75 mil die gap and targeting 0.75 mil gauge (for the LLDPE films) and using a 60 mil die gap targeting 1.0 mil gauge (for the VLDPE films). More detailed film run conditions are included with film data in Table 5.

TABLE 5

| | Example No. | | | | | | |
|---|---|---|---|---|---|---|---|
| | 46 | 47 | 48 | 49 | 50 | 51 | 52 |
| Catalyst | Inventive | Inventive | Inventive | Inventive | Inventive | Traditional Metallocene | Ziegler-Natta |
| Comonomer | Hexene | Hexene | Hexene | Hexene | Hexene | Hexene | Hexene |
| Melt Index ($I_{2.16}$), g/10 min | 0.79 | 0.84 | 0.86 | 0.85 | 0.99 | 1.07 | 0.947 |
| High Load MI ($I_{21.6}$), g/10 min | 27.3 | 27.7 | 26.2 | 27.8 | 29.4 | 16.9 | 24.4 |
| Melt Index Ratio ($I_{21.6}/I_{2.16}$) | 34.6 | 33.0 | 30.5 | 32.7 | 29.7 | 15.8 | 25.8 |
| Density (g/cm$^3$) | 0.9184 | 0.9178 | 0.9181 | 0.9184 | 0.9195 | 0.9195 | 0.9218 |
| Melt Temperature (° F.) | 414 | 414 | 414 | 413 | 412 | 425 | 420 |
| Output (lb/h) | 189 | 187 | 189 | 188 | 188 | 187 | 187 |
| Head Pressure (psi) | 3400 | 3330 | 3350 | 3340 | 3220 | 3450 | 3190 |
| Die Pressure (psi) | 2190 | 2160 | 2160 | 2180 | 2050 | 2060 | 1920 |
| Motor Load (amps) | 71.1 | 69.5 | 71.3 | 69.0 | 68.8 | 75.4 | 68.3 |
| Screw Speed (rpm) | 65.5 | 66.0 | 65.5 | 66.5 | 65.5 | 67.0 | 64.0 |
| Line Speed (fpm) | 222 | 222 | 222 | 222 | 222 | 222 | 222 |
| Gauge (mils) | 0.74 | 0.74 | 0.74 | 0.74 | 0.74 | 0.75 | 0.75 |
| FLH (in) | 21 | 21 | 21 | 21 | 21 | 22 | 23 |
| Tensile at Yield, MD (psi) | 1340 | 1330 | 1310 | 1330 | 1370 | 1340 | 1230 |
| Tensile at Yield, TD (psi) | 1510 | 1440 | 1450 | 1420 | 1490 | 1320 | 1270 |
| Ultimate Tensile, MD (psi) | 8990 | 9580 | 9100 | 9210 | 8730 | 9560 | 7190 |
| Ultimate Tensile, TD (psi) | 6430 | 6460 | 7140 | 6170 | 6560 | 7220 | 5310 |
| Ultimate Elongation, MD (%) | 310 | 330 | 330 | 330 | 350 | 440 | 500 |
| Ultimate Elongation, TD (%) | 610 | 590 | 610 | 590 | 630 | 610 | 670 |
| 1% Secant Modulus, MD (psi) | 30140 | 28010 | 29070 | 28100 | 28510 | 24630 | 24260 |
| 1% Secant Modulus, TD (psi) | 40232 | 35790 | 35140 | 35470 | 35700 | 27730 | 25730 |
| Puncture Force (lbs/mil) | 12 | 13 | 14 | 15 | 15 | 14 | 10 |

TABLE 5-continued

| | Example No. | | | | | | |
|---|---|---|---|---|---|---|---|
| | 46 | 47 | 48 | 49 | 50 | 51 | 52 |
| Puncture Energy (in · lb/mil) | 33 | 41 | 42 | 45 | 47 | 50 | 25 |
| Elmendorf Tear, MD (g/mil) | 590 | 540 | 490 | | | | |
| Elmendorf Tear, MD (g/mil) | 500 | 380 | 480 | 380 | 410 | 310 | 430 |
| Elmendorf Tear, TD (g/mil) | 470 | 460 | 470 | 480 | 500 | 450 | 680 |
| Dart Drop (g) | 620 | 780 | 690 | 850 | 590 | 380 | 300 |
| Dart Drop per mil | 790 | 1020 | 910 | 1120 | 790 | 510 | 390 |
| Gauge (mils) | 0.78 | 0.76 | 0.76 | 0.76 | 0.75 | 0.75 | 0.76 |
| Shrink, MD (%) | 74 | 72 | 71 | 73 | 71 | 57 | 62 |
| Shrink, TD (%) | −24 | −21 | −22 | −22 | −20 | −11 | −10 |
| Reblock (g) | 27 | 17 | 14 | 13 | 31 | 36 | 73 |
| Haze (%) | 29 | 26 | 30 | 30 | 23 | 15 | 17 |
| Clarity (%) | 94 | 94 | 93 | 92 | 96 | 97 | 79 |
| Gloss - 45° reflectance | 24 | 20 | 20 | 16 | 29 | 44 | 48 |

Blown films were produced from a range of inventive resins and commercial controls of similar MI and density. The inventive films demonstrate an excellent balance of toughness vs. stiffness, far superior to the controls. For instance, Example 48 shows tensile strength, puncture and TD tear that are comparable to the comparative resin of Example 51, while the 1% secant modulus is approximately 20% higher, MD tear is 50% higher and dart impact is 80% higher than the control. This dramatically improved toughness vs. stiffness balance, combined with good film processing and lower reblock values, offers improved performance for film applications. For example, the inventive resin's toughness vs. stiffness balance allows for downgauging and superior performance in most all end-use applications.

Example 53-56

Commercial VLDPE controls and inventive resins were made into standard blown films at 100% and in blends with 5% LDPE. The films contained normal processing additives only with no slip, antiblock or pigment. Properties of the films are presented in Table 6.

TABLE 6

| | Example No. | | | |
|---|---|---|---|---|
| | 53 | 54 | 55 | 56 |
| Catalyst | Inventive | Inventive | Traditional Metallocene | Traditional Metallocene |
| Comonomer | Hexene | Hexene | Hexene | Hexene |
| Composition | 100% LLDPE | 95% LLDPE 5% LDPE | 100% LLDPE | 95% LLDPE 5% LDPE |
| Melt Index ($I_{2.16}$), g/10 min | 0.75 | | 1.07 | |
| High Load MI ($I_{21.6}$), g/10 min | 24.6 | | 17.9 | |
| Melt Index Ratio ($I_{21.6}/I_{2.16}$) | 32.8 | | 16.7 | |
| Density (g/cm³) | 0.9151 | | 0.9144 | |
| Melt Temperature (° F.) | 392 | 394 | 399 | 399 |
| Extruder Output (lb/h) | 152 | 148 | 150 | 149 |
| Head Pressure (psi) | 3400 | 3530 | 3470 | 3550 |
| Die Pressure (psi) | 2260 | 2360 | 2150 | 2230 |
| Motor Load (amps) | 67.0 | 65.8 | 73.8 | 72.0 |
| Screw Speed (rpm) | 53.4 | 53.4 | 51.4 | 51.4 |
| Line Speed (fpm) | 132 | 132 | 132 | 132 |
| Gauge (mils) | 1.00 | 0.99 | 1.00 | 0.99 |
| FLH (in) | 20 | 12 | 15 | 14 |
| ESO (lb/hp-h) | 10.01 | 9.94 | 9.28 | 9.48 |
| Tensile at Yield, MD (psi) | 1170 | 1320 | 1040 | 1130 |
| Tensile at Yield, TD (psi) | 1230 | 1520 | 1030 | 1220 |
| Ultimate Tensile, MD (psi) | 8520 | 8880 | 9150 | 10730 |
| Ultimate Tensile, TD (psi) | 7680 | 7390 | 8870 | 8580 |
| Ultimate Elongation, MD (%) | 370 | 330 | 420 | 470 |
| Ultimate Elongation, TD (%) | 580 | 590 | 620 | 610 |
| 1% Secant Modulus, MD (psi) | 23660 | 27570 | 17920 | 20850 |
| 1% Secant Modulus, TD (psi) | 27560 | 39670 | 18990 | 25010 |
| Puncture Force (lbs/mil) | 11 | 11 | 14 | 15 |
| Puncture Energy (in · lb/mil) | 35 | 33 | 53 | 57 |
| Elmendorf Tear, MD (g/mil) | 230 | 140 | 200 | 160 |
| Elmendorf Tear, TD (g/mil) | 380 | 400 | 360 | 400 |
| Elmendorf Tear, MD/TD Ratio | | | | |
| Dart Drop (g) | 1400+ | 1180 | 1190 | 1080 |
| Dart Drop per mil | no break | 1150 | 1160 | 1100 |
| Gauge (mils) | 1.02 | 1.01 | 1.02 | 0.98 |
| Shrink, MD (%) | 65 | 71 | 54 | 60 |
| Shrink, TD (%) | −5 | −1 | −5 | −6 |
| Reblock (g) | 26 | 210 | 132 | 190 |

TABLE 6-continued

| | Example No. | | | |
|---|---|---|---|---|
| | 53 | 54 | 55 | 56 |
| Haze (%) | 33 | 5.8 | 7.9 | 1.8 |
| Clarity | 91 | 99 | 99 | 100 |
| Gloss | 18 | 69 | 54 | 87 |

One approach for comparing film data is to compare films of equivalent stiffness as indicated by 1% Secant Modulus, because films are frequently used in applications that require stiffness for adequate end-use performance. The pure films of Table 6 show that the inventive sample has approximately 30% higher stiffness than the control with equivalent tear, dart and very low reblock. Similar trends are seen in the blends, which include 5% LDPE, with the inventive resin showing a dramatic toughness vs. stiffness advantage. One skilled in the art will recognize that the performance of the inventive resins may readily be adjusted as needed to take advantage of this superior performance. For example, inventive resin density can be reduced, resulting in a softer film (like the control) with further toughness enhancement.

Examples 57-60

Inventive resins were blended with LDPE, HDPE and LLDPE and were processed into blown films on a 2.5 inch Gloucester Blown Film Line at a 2.5 BUR using a 75 mil die gap, targeting 0.75 mil gauge. More detailed film run conditions are included with film data in Table 7. These results show the broad blending versatility of the inventive resins. This compatability with other resins allows the end user to blend further components to achieve desirable end use or processing performance.

TABLE 7

| | Example No. | | | |
|---|---|---|---|---|
| | 57 | 58 | 59 | 60 |
| Composition | 100% Inventive LLDPE | 98% Inventive LLDPE 2% LDPE | 95% Inventive LLDPE 5% HDPE | 75% Inventive LLDPE 25% Traditional LLDPE |
| Melt Index (I$_{2.16}$), g/10 min | 0.86 | | | |
| High Load MI (I$_{21.6}$), g/10 min | 27.3 | | | |
| Melt Index Ratio (I$_{21.6}$/I$_{2.16}$) | 31.7 | | | |
| Density (g/cm$^3$) | 0.9184 | | | |
| Temperature Profile (° F.) | | | | |
| Feedthroat | 79 | 79 | 79 | 78 |
| BZ1 | 310 | 309 | 309 | 310 |
| BZ2 | 400 | 400 | 400 | 400 |
| BZ3 | 380 | 380 | 380 | 380 |
| BZ4 | 335 | 335 | 335 | 335 |
| BZ5 | 335 | 335 | 335 | 335 |
| Screen Changer | 390 | 390 | 390 | 390 |
| Adapter | 391 | 389 | 390 | 389 |
| Rotator | 390 | 390 | 390 | 390 |
| Lower Die | 390 | 390 | 390 | 390 |
| Upper Die | 390 | 391 | 391 | 390 |
| Inside Die | 396 | 395 | 395 | 397 |
| Melt Temperature (° F.) | 396 | 396 | 395 | 395 |
| Output (lb/h) | 188 | 189 | 188 | 188 |
| Head Pressure (psi) | 3630 | 3640 | 3540 | 3660 |
| Die Pressure (psi) | 2450 | 2460 | 2430 | 2480 |
| Motor Load (amps) | 64.6 | 64.1 | 62.3 | 64.9 |
| Screw Speed (rpm) | 58.9 | 59.4 | 59.4 | 57.8 |
| Line Speed (fpm) | 225 | 225 | 225 | 225 |
| Gauge (mils) | 0.74 | 0.77 | 0.76 | 0.74 |
| FLH (in) | 20 | 20 | 18 | 20 |
| Air (%) | 67.6 | 67.6 | 67.6 | 67.6 |
| Tensile at Yield, MD (psi) | 1410 | 1460 | 1530 | 1370 |
| Tensile at Yield, TD (psi) | 1600 | 1720 | 1860 | 1600 |
| Ultimate Tensile, MD (psi) | 10330 | 10350 | 10180 | 9910 |
| Ultimate Tensile, TD (psi) | 7610 | 7600 | 7400 | 6560 |
| Ultimate Elongation, MD (%) | 330 | 320 | 330 | 350 |
| Ultimate Elongation, TD (%) | 650 | 630 | 650 | 660 |
| 1% Secant Modulus, MD (psi) | 28850 | 30580 | 34070 | 27830 |
| 1% Secant Modulus, TD (psi) | 37790 | 44190 | 47730 | 32480 |
| Puncture Force (lbs/mil) | 13 | 15 | 15 | 14 |
| Puncture Energy (in · lb/mil) | 38 | 46 | 43 | 42 |
| Elmendorf Tear, MD (g/mil) | 510 | 310 | 360 | 500 |
| Elmendorf Tear, TD (g/mil) | 510 | 520 | 580 | 560 |
| Elmendorf Tear, MD/TD Ratio | | | | |

TABLE 7-continued

| | Example No. | | | |
|---|---|---|---|---|
| | 57 | 58 | 59 | 60 |
| Dart Drop (g) | 540 | 390 | 300 | 200 |
| Dart Drop per mil | 720 | 520 | 400 | 270 |
| Gauge (mils) | 0.76 | 0.74 | 0.74 | 0.76 |
| Shrink, MD (%) | 72 | 73 | 73 | 74 |
| Shrink, TD (%) | −22 | −21 | −21 | −23 |
| Reblock (g) | 20 | 155 | 62 | 37 |
| Haze (%) | 29 | 7.2 | 8.5 | 22 |
| Gloss | 24 | 71 | 58 | 24 |

Examples 61-62

Inventive resins were also evaluated in cast film extrusion applications and compared with a commercial Ziegler-Natta catalyzed hexene-1 copolymer product. Example 61 was produced from a commercial LLDPE having a melt index of 2.1 and a density of 0.942 g/cc. Example 62 was produced from inventive resin having a melt index of 1.6 and a density of 0.944 g/cc. These films were processed into cast film on a cast line manufactured by Black Clawson Equipment having a 3½ inch extruder with a barrier screw, a 42 inch wide die, a nominal 20-mil die gap, and a 30-inch diameter primary chill roll. The line was operated at normal conditions of approximately 650 lbs per hour and an average 530° F. melt temperature. The chill roll temperature was approximately 80° F. Nominal 0.80 mil films were produced at a line speed of approximately 750 feet per minute. Properties of the films produced are given in Table 8.

TABLE 8

| | Example No. | |
|---|---|---|
| | 61 | 62 |
| 1% Secant Modulus, MD (psi) | 84090 | 89750 |
| 1% Secant Modulus, TD (psi) | 106390 | 109380 |
| Tensile at Yield, MD (psi) | 6220 | 6380 |
| Tensile at Yield, TD (psi) | 5710 | 6170 |
| Puncture Peak Force (lb/mil) | 4.7 | 5.3 |
| Puncture Break Energy (in-lb/mil) | 4.0 | 4.9 |
| Elmendorf Tear, MD (g/mil) | 24 | 29 |

TABLE 8-continued

| | Example No. | |
|---|---|---|
| | 61 | 62 |
| Elmendorf Tear, TD (g/mil) | 80 | 50 |
| Dart Impact (g/mil) | 44 | 57 |

Examples 63-84

Inventive resins were blended with a metallocene catalyzed HDPE at a level of 10 wt % to exploit the excellent stiffness versus toughness balance of the inventive resin. The HDPE resins used in these examples were produced from a traditional metallocene catalyst with a narrow MWD and were homopolymers with melt indexes ranging from 1 up to 200. The resin blends were processed into blown films on a 2.5 inch Gloucester Blown Film Line under a variety of conditions to demonstrate the broad processing flexibility as well as to determine effects on film physical properties. A BUR ranging from 2.0 to 3.0 with die gaps ranging from 45 mil to 60 mil were used in the study. Two film gauges were prepared at 0.6 mil and 1.0 mil to better understand drawdown effects. In general, higher drawdowns and extrusion conditions that provide greater orientation yielded the toughest films. Although typical film resins decrease in impact and tear as modulus increases, the modulus of these films could be increased by approximately 30% with essentially no change in film impact and tear performance. More detailed film run conditions and film physical properties are included with film data for the nominal 0.6 mil film in Table 9 and the nominal 1.0 mil film in Table 10.

TABLE 9

| | Example | | | | | |
|---|---|---|---|---|---|---|
| | 63 | 64 | 65 | 66 | 67 | 68 |
| Density | 0.9196 | 0.9241 | 0.9241 | 0.9241 | 0.9241 | 0.9241 |
| MI | 0.612 | 0.842 | 0.842 | 0.842 | 0.842 | 0.842 |
| HLMI | 20.86 | 29.75 | 29.75 | 29.75 | 29.75 | 29.75 |
| MIR | 34.1 | 35.3 | 35.3 | 35.3 | 35.3 | 35.3 |
| High Density Component | None | 0.965, 20 MI | 0.965, 20 MI | 0.965, 20 MI | 0.965, 20 MI | 0.965, 20 MI |
| Processing Conditions | | | | | | |
| Output (lb/hr/in) | 10.13 | 11.99 | 8.03 | 8.08 | 9.94 | 12.06 |
| BUR/Die gap | 2.5/60 | 2.0/60 | 2.0/60 | 2.0/60 | 2.5/60 | 3.0/45 |
| Melt Temp (° F.) | 426 | 410 | 439 | 411 | 425 | 411 |
| FLH (in) | 25 | 29 | 25 | 24 | 26 | 26 |
| Gauge Target (mil) | 0.6 | 0.6 | 0.6 | 0.6 | 0.6 | 0.6 |
| Tensile @ Yield, MD (psi) | 1529 | 1741 | 1661 | 1680 | 1616 | 1650 |
| Tensile @ Yield, TD (psi) | 1689 | 1895 | 1784 | 1742 | 1829 | 1940 |
| Tensile at 200% MD | 4063 | 4376 | 2953 | 3440 | 2741 | 3002 |
| Ultimate Tensile, MD (psi) | 10426 | 8836 | 8179 | 10141 | 9062 | 9883 |
| Ultimate Tensile, TD (psi) | 7666 | 6211 | 6379 | 6350 | 6434 | 7176 |
| Elongation @ Yield, MD (%) | 6.2 | 5.7 | 5.6 | 5.5 | 5.4 | 5.8 |

TABLE 9-continued

| | | | | | | |
|---|---|---|---|---|---|---|
| Elongation @ Yield, TD (%) | 4.8 | 4.8 | 4.9 | 4.7 | 4.8 | 5.4 |
| Break Elongation, MD (%) | 297 | 277 | 320 | 324 | 344 | 342 |
| Break Elongation, TD (%) | 701 | 769 | 732 | 682 | 701 | 693 |
| 1% Secant, MD (psi) | 31022 | 37374 | 36931 | 36045 | 37357 | 37511 |
| 1% Secant, TD (psi) | 40287 | 51184 | 48228 | 44029 | 46929 | 49537 |
| 1% Secant, Average (psi) | 35655 | 44279 | 42580 | 40037 | 42143 | 43524 |
| Elmendorf Tear, MD (g) | 315 | 272 | 398 | 446 | 231 | 331 |
| Elmendorf Tear, TD (g) | 394 | 514 | 426 | 419 | 402 | 369 |
| Elmendorf Tear per mil, MD | 509 | 445 | 675 | 719 | 379 | 542 |
| Elmendorf Tear per mil, TD | 646 | 816 | 747 | 655 | 659 | 605 |
| Dart Drop (g) | 300 | 155 | 204 | 285 | 234 | 312 |
| Dart Drop per mil | 492 | 245 | 352 | 467 | 390 | 529 |
| Gauge, Average (mil) | 0.61 | 0.63 | 0.58 | 0.61 | 0.60 | 0.59 |
| Gauge, Low (mil) | 0.56 | 0.53 | 0.52 | 0.58 | 0.53 | 0.55 |
| Gauge, High (mil) | 0.69 | 0.78 | 0.66 | 0.68 | 0.68 | 0.67 |

| | Example | | | | |
|---|---|---|---|---|---|
| | 69 | 70 | 71 | 72 | 73 |
| Density | 0.9241 | 0.9241 | 0.9241 | 0.9255 | 0.9238 |
| MI | 0.842 | 0.842 | 0.842 | 0.948 | 0.687 |
| HLMI | 29.75 | 29.75 | 29.75 | 37.01 | 22.12 |
| MIR | 35.3 | 35.3 | 35.3 | 39.0 | 32.2 |
| High Density Component | 0.965, 20 MI | 0.965, 20 MI | 0.965, 20 MI | 0.972, 200 MI | 0.956, 1 MI |
| Processing Conditions | | | | | |
| Output (lb/hr/in) | 12.07 | 7.99 | 8.01 | 9.96 | 9.94 |
| BUR/Die gap | 3.0/45 | 3.0/45 | 3.0/45 | 2.5/60 | 2.5/60 |
| Melt Temp (° F.) | 440 | 441 | 412 | 419 | 426 |
| FLH (in) | 42 | 22 | 19 | 25 | 26 |
| Gauge Target (mil) | 0.6 | 0.6 | 0.6 | 0.6 | 0.6 |
| Tensile @ Yield, MD (psi) | 1584 | 1615 | 1590 | 1711 | 1658 |
| Tensile @ Yield, TD (psi) | 1871 | 1738 | 1760 | 1929 | 1837 |
| Tensile at 200% MD | 2158 | 2127 | 2422 | 2626 | 2973 |
| Ultimate Tensile, MD (psi) | 8634 | 9662 | 9715 | 9510 | 9526 |
| Ultimate Tensile, TD (psi) | 6877 | 6896 | 7225 | 6917 | 6524 |
| Elongation @ Yield, MD (%) | 6.1 | 6.0 | 5.3 | 5.5 | 5.5 |
| Elongation @ Yield, TD (%) | 5.8 | 4.9 | 5.0 | 5.1 | 5.2 |
| Break Elongation, MD (%) | 410 | 431 | 384 | 358 | 335 |
| Break Elongation, TD (%) | 665 | 666 | 680 | 694 | 736 |
| 1% Secant, MD (psi) | 36383 | 36344 | 36192 | 38960 | 37647 |
| 1% Secant, TD (psi) | 48215 | 43512 | 44674 | 49841 | 46413 |
| 1% Secant, Average (psi) | 42299 | 39928 | 40433 | 44401 | 42030 |
| Elmendorf Tear, MD (g) | 103 | 240 | 297 | 143 | 535 |
| Elmendorf Tear, TD (g) | 327 | 301 | 326 | 410 | 472 |
| Elmendorf Tear per mil, MD | 175 | 393 | 479 | 235 | 849 |
| Elmendorf Tear per mil, TD | 518 | 493 | 518 | 707 | 762 |
| Dart Drop (g) | 461 | 414 | 390 | 190 | 219 |
| Dart Drop per mil | 768 | 702 | 650 | 317 | 371 |
| Gauge, Average (mil) | 0.60 | 0.59 | 0.60 | 0.60 | 0.59 |
| Gauge, Low (mil) | 0.52 | 0.51 | 0.52 | 0.52 | 0.49 |
| Gauge, High (mil) | 0.67 | 0.65 | 0.68 | 0.68 | 0.69 |

TABLE 10

| | Example | | | | | |
|---|---|---|---|---|---|---|
| | 74 | 75 | 76 | 77 | 78 | 79 |
| Density | 0.9196 | 0.9241 | 0.9241 | 0.9241 | 0.9241 | 0.9241 |
| Melt Index ($I_{2.16}$), g/10 min | 0.612 | 0.842 | 0.842 | 0.842 | 0.842 | 0.842 |
| High Load MI ($I_{21.6}$), g/10 min | 20.86 | 29.75 | 29.75 | 29.75 | 29.75 | 29.75 |
| Melt Index Ratio ($I_{21.6}/I_{2.16}$) | 34.1 | 35.3 | 35.3 | 35.3 | 35.3 | 35.3 |
| High Density Component | None | 0.965, 20 MI | 0.965, 20 MI | 0.965, 20 MI | 0.965, 20 MI | 0.965, 20 MI |
| Output (lb/hr/in) | 9.89 | 12.02 | 8.01 | 8.12 | 9.94 | 11.99 |
| BUR/Die gap | 2.5/60 | 2.0/60 | 2.0/60 | 2.0/60 | 2.5/60 | 3.0/45 |
| Melt Temp (° F.) | 429 | 410 | 440 | 410 | 424 | 412 |
| FLH (in) | 25 | 29 | 24 | 24 | 26 | 26 |
| Gauge Target (mil) | 1 | 1 | 1 | 1 | 1 | 1 |
| Tensile @ Yield, MD (psi) | 1430 | 1674 | 1586 | 1647 | 1643 | 1643 |
| Tensile @ Yield, TD (psi) | 1673 | 1956 | 1843 | 1831 | 1921 | 1920 |
| Tensile at 200%, MD (psi) | 2145 | 2491 | 2027 | 2203 | 1998 | 2088 |
| Ultimate Tensile, MD (psi) | 9368 | 8591 | 8391 | 8930 | 8584 | 8557 |
| Ultimate Tensile, TD (psi) | 7843 | 6586 | 6424 | 6924 | 6975 | 7080 |
| Elongation at Yield, MD (%) | 5.4 | 5.5 | 5.1 | 5.7 | 5.9 | 5.6 |
| Elongation at Yield, TD (%) | 4.8 | 4.8 | 4.7 | 5.1 | 5.6 | 4.9 |

TABLE 10-continued

| | | | | | | |
|---|---|---|---|---|---|---|
| Break Elongation, MD (%) | 408 | 375 | 441 | 420 | 455 | 436 |
| Break Elongation, TD (%) | 692 | 710 | 698 | 690 | 688 | 682 |
| 1% Secant Modulus, MD (psi) | 33454 | 36474 | 37436 | 37605 | 37574 | 38155 |
| 1% Secant Modulus, TD (psi) | 42209 | 53346 | 48335 | 48224 | 49699 | 50558 |
| 1% Secant Modulus, average (psi) | 37832 | 44910 | 42886 | 42915 | 43637 | 44357 |
| Elmendorf Tear, MD (g) | 349 | 126 | 179 | 245 | 217 | 231 |
| Elmendorf Tear, TD (g) | 507 | 554 | 549 | 539 | 507 | 485 |
| Elmendorf Tear per mil, MD | 339 | 122 | 175 | 245 | 213 | 224 |
| Elmendorf Tear per mil, TD | 497 | 543 | 528 | 523 | 507 | 475 |
| Dart Drop (g) | 714 | 234 | 383 | 402 | 414 | 558 |
| Dart Drop per mil | 707 | 227 | 368 | 410 | 414 | 558 |
| Gauge (mils), Average | 1.01 | 1.03 | 1.04 | 0.98 | 1.00 | 1.00 |
| Gauge (mils), Low | 0.93 | 0.93 | 0.90 | 0.90 | 0.91 | 0.91 |
| Gauge (mils), High | 1.09 | 1.12 | 1.12 | 1.05 | 1.08 | 1.15 |

| | Example | | | | |
|---|---|---|---|---|---|
| | 80 | 81 | 82 | 83 | 84 |
| Density | 0.9241 | 0.9241 | 0.9241 | 0.9255 | 0.9238 |
| Melt Index ($I_{2.16}$), g/10 min | 0.842 | 0.842 | 0.842 | 0.948 | 0.687 |
| High Load MI ($I_{21.6}$), g/10 min | 29.75 | 29.75 | 29.75 | 37.01 | 22.12 |
| Melt Index Ratio ($I_{21.6}/I_{2.16}$) | 35.3 | 35.3 | 35.3 | 39.0 | 32.2 |
| High Density Component | 0.965, 20 MI | 0.965, 20 MI | 0.965, 20 MI | 0.972, 200 MI | 0.956, 1 MI |
| Output (lb/hr/in) | 12.08 | 7.84 | 8.01 | 10.02 | 9.96 |
| BUR/Die gap | 3.0/45 | 3.0/45 | 3.0/45 | 2.5/60 | 2.5/60 |
| Melt Temp (° F.) | 441 | 442 | 412 | 422 | 426 |
| FLH (in) | 40 | 22 | 19 | 25 | 26 |
| Gauge Target (mil) | 1 | 1 | 1 | 1 | 1 |
| Tensile @ Yield, MD (psi) | 1581 | 1543 | 1530 | 1622 | 1644 |
| Tensile @ Yield, TD (psi) | 1846 | 1780 | 1738 | 1894 | 1888 |
| Tensile at 200%, MD (psi) | 1885 | 1857 | 1879 | 1929 | 2128 |
| Ultimate Tensile, MD (psi) | 8072 | 8203 | 8394 | 8451 | 9134 |
| Ultimate Tensile, TD (psi) | 7409 | 7351 | 7154 | 6707 | 7007 |
| Elongation at Yield, MD (%) | 5.3 | 5.3 | 5.1 | 5.2 | 5.7 |
| Elongation at Yield, TD (%) | 4.9 | 5.0 | 4.9 | 5 | 5.2 |
| Break Elongation, MD (%) | 493 | 511 | 488 | 480 | 443 |
| Break Elongation, TD (%) | 692 | 673 | 671 | 682 | 711 |
| 1% Secant Modulus, MD (psi) | 37749 | 35631 | 36748 | 40280 | 37191 |
| 1% Secant Modulus, TD (psi) | 47513 | 44553 | 44567 | 51173 | 48929 |
| 1% Secant Modulus, average (psi) | 42631 | 40092 | 40658 | 45727 | 43060 |
| Elmendorf Tear, MD (g) | 199 | 265 | 246 | 125 | 284 |
| Elmendorf Tear, TD (g) | 492 | 462 | 464 | 527 | 572 |
| Elmendorf Tear per mil, MD | 195 | 257 | 246 | 124 | 275 |
| Elmendorf Tear per mil, TD | 478 | 453 | 450 | 488 | 561 |
| Dart Drop (g) | 1028 | 968 | 875 | 398 | 353 |
| Dart Drop per mil | 1017 | 959 | 857 | 386 | 353 |
| Gauge (mils), Average | 1.01 | 1.01 | 1.02 | 1.03 | 1.00 |
| Gauge (mils), Low | 0.90 | 0.89 | 0.96 | 0.80 | 0.90 |
| Gauge (mils), High | 1.12 | 1.11 | 1.07 | 1.29 | 1.10 |

Examples 85-86

Inventive resins were prepared ranging from 2MI to 150 MI and 0.920 to 0.970 density. The melt index and density were targeted to mimic resins most commonly used in injection molding applications. The granular resin material was pelletized, and a stabilization package comprising 250 ppm IR1076 and 500 ppm zinc stearate was added. Resin data are shown in Table 11.

TABLE 11

| | Example No. | |
|---|---|---|
| | 85 | 86 |
| Catalyst | Inventive | Ziegler-Natta |
| Melt Index ($I_{2.16}$), g/10 min | 5.9 | 6.8 |
| Melt Flow Ratio | 17.3 | 24.1 |
| Density (g/cm3) | 0.954 | 0.952 |
| Melting Point (° C.), determined by DSC | 133.4 | 131.7 |

As shown in Table 11, the inventive resin has a MFR (melt flow ratio) significantly lower at 17.3 than the Ziegler-Natta catalyzed control resin. This MFR is indicative of a relatively narrow molecular weight distribution. Although GPC and CRYSTAF were not run for Example 85, they would be expected to show a $M_w/M_n$<3 and a narrow composition distribution at 0.954 density.

Examples 87-88

An investigation of the processing character of the resins of Examples 85 and 86 was carried out by measuring the "spiral flow" of the materials on a 225T Husky apparatus at three pressures using a spiral flow mold in accordance with ASTM D-3123. A summary of the spiral flow data acquired is listed in Table 12.

TABLE 12

| | Example No. | |
|---|---|---|
| | 87 | 88 |
| Catalyst | Inventive | Ziegler-Natta |
| Spiral Flow at 700 psi (in) | 14.4 | 17.6 |

TABLE 12-continued

| | Example No. | |
|---|---|---|
| | 87 | 88 |
| Spiral Flow at 1200 psi (in) | 22.4 | 27.0 |
| Spiral Flow at 1700 psi (in) | 28.4 | 32.7 |

As might be expected, since the inventive resin has both a lower MI and MFR, spiral flow lengths are shorter (more difficult to process) than the control resin at every pressure. These differences are significant at around 15%, but likely could be overcome with a combination of slightly higher MI for the inventive material in combination with slightly higher melt temperatures. Higher melt temperatures might lead to slightly longer cycle times (longer cooling).

Examples 89-92

Using strips cut from impact disks produced on a 225T Husky injection molder with a mold in accordance with ASTM D-1693, bent strip environmental stress crack resistance (ESCR) testing in 10% and 100% Igepal solutions was conducted on the resins of Examples 85 and 86. The data are plotted and regressed in Tables 13-16. The F50 (50% failure) values of the inventive resin were about 6 hours for both the 10% and 100% Igepal tests. The control resin gave 9 and 20 hours respectively for the 10% and 100% Igepal tests. These data suggest perhaps slightly inferior ESCR performance for the inventive resin, but the higher density of the inventive resin may be a factor as well.

In addition to the bent strip ESCR testing, 5-gallon pails molded from the inventive and control resins of Examples 85 and 86 were subjected to "pail" ESCR testing. Cycle time for the inventive resin was about 5% higher than the control resin at 18 seconds. The test involves placing the pails in an oven at 55° C. filled with 10% Igepal solution, loading them with a top weight of 200 pounds and monitoring for cracks or leaks for 60 days. Neither the control nor the inventive pail bodies failed this industry standard test. This would suggest at least adequate performance for the inventive resin in pail applications.

Examples 93-94

Injection molded parts (from a part mold on a 225T Husky apparatus in accordance with ASTM D-638) from the inventive and control resins of Examples 85 and 86 were subjected to several tensile tests. Results are listed in Table 17.

TABLE 17

| | Example No. | |
|---|---|---|
| | 93 | 94 |
| Catalyst | Inventive | Ziegler-Natta |
| Melt Index (I$_{2.16}$), g/10 min | 5.9 | 6.8 |
| Melt Flow Ratio | 17.3 | 24.1 |
| Density (g/cm$^3$) | 0.954 | 0.952 |
| Yield Stress (psi) | 3700 | 3600 |
| Break Stress (psi) | 2100 | 2000 |
| Break Strain (%) | 65 | 55 |
| 1% Flex Modulus (psi) | 131000 | 124000 |
| Top Load (lb) | 1690 | 1770 |
| Izod Impact, −20° C. (ft-lbf/in) | 2.9 | 1.4 |
| Izod Impact, −40° C. (ft-lbf/in) | 1.8 | 1.3 |

Tensile data and top load results for both resins are comparable (within testing precision), taking into account subtle differences in MI and density. Toughness, as measured by low temperature Izod Impact testing, suggests the inventive material to be superior, as the Izod results are 40% to 100% higher.

Example 95

Two-gallon pails made from the inventive and control resins of Example 85 and 86 were molded in a 225T Husky apparatus and subjected to a Bruceton stair step drop test at −20° C. (the pails were filled with ethylene glycol for the drop tests). The 2-gallon pails made with the inventive resin had a F50 drop height of about 9 feet compared to about 6 feet for the control resin. This further confirms the improved toughness properties of the inventive resin. Results of pail drop testing for the inventive resin along with a comparative Ziegler-Natta control resin is shown in Table 18.

The failure mode of the inventive pails was observed to be somewhat different than the pails made with the control resin. Of the inventive pails that did fail in the drop testing, all of the failures occurred on the sides of the pail, not through the gate and the sides as was typical of the failed control pails. This could indicate less residual stress in the gate area for the inventive pails, likely a direct result of the narrow molecular weight distribution of the inventive resin.

TABLE 18

Spiral Flow vs. Pail Drop

| Sample | Spiral Flow (in. at 1300 psi) | Pail Drop (ft. at −20° C.) |
|---|---|---|
| Ziegler-Natta control | 24.4 | 5.7 |
| Ziegler-Natta control | 25.0 | 6.6 |
| Ziegler-Natta control | 25.3 | 6.2 |
| Inventive | 22.4 | 8.9 |

In addition to the 2 gallon pail testing, 5 gallon pails produced on a 550T Husky press were also dropped at −20° C. These were the same 5 gallon pails used in the pail ESCR testing of Examples 89-92. The control pails had a F50 drop height of about 6 feet, and the inventive about 11 feet.

Examples 96-101

Inventive and control resins were prepared and formed, via rotational molding, into tanks, which were then tested for warping, shrinkage, and toughness. The tanks were molded on a Ferry Industries rotational molder at 500° F. Measurements were taken in the same place on each tank and shrinkage and warping were calculated accordingly. Toughness was tested by measuring yield energy and total energy for each tank with respect to the right axis, and by measuring percent ductility with respect to the left axis. Yield energy, total energy, and % ductility were determined in accordance with ASTM D-3763. Results of toughness testing on two sets of rotomolded tanks are reflected in Tables 20 and 21. As reflected in Table 19, the inventive resins exhibit better processability, as evidenced by the shortened cycle times required for forming the tanks when compared to the controls.

TABLE 19

| | Example No. | | | | | |
|---|---|---|---|---|---|---|
| | 96 | 97 | 98 | 99 | 100 | 101 |
| Composition | Ziegler-Natta LLDPE | Inventive LLDPE | Inventive LLDPE | Inventive LLDPE | Inventive LLDPE | Ziegler-Natta LLDPE |
| Melt Index ($I_{2.16}$), g/10 min | 5.0 | 7.7 | 7.7 | 9.0 | 9.0 | 5.0 |
| Density, g/cm³ | 0.936 | 0.935 | 0.935 | 0.937 | 0.937 | 0.936 |
| Part thickness, mils | 145-155 | 145-155 | 145-155 | 145-155 | 145-155 | 145-155 |
| Cycle time (heat + cool) (min) | 15 | 13.5 | 12 | 12 | 13.5 | 16.5 |
| Shrinkage dimension (in) | 5/16" | 3/8" | 3/8" | 5/16" | 3/8" | 3/8" |
| Warpage Measurement (in) | 1/8" | 1/16" | 1/4" | 0" | 1/8" | 1/8" | detail with reference to certain aspects and embodiments thereof, other aspects and embodiments are possible. Therefore, the spirit and scope of the appended claims should not be limited to the description of the embodiments contained herein.

Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated herein by reference for all jurisdictions in which such incorporation is permitted.

What is claimed is:

1. A polymer composition comprising a blend of:
   a. from about 5 to about 95 wt % of a first polymer selected from the group consisting of high density polyethylene, linear low density polyethylene, low density polyethylene, medium density polyethylene, very low density polyethylene, differentiated polyethylene, and combinations thereof; and
   b. from about 95 to about 5 wt % of a second polymer comprising an ethylene-based polymer produced by gas-phase polymerization of ethylene with a catalyst having as a transition metal component a bis(n-$C_{3-4}$ alkyl cyclopentadienyl) hafnium compound, wherein said transition metal component comprises from about 95 mole % to about 99 mole % of said hafnium compound and wherein said ethylene-based polymer has:
      i. a melt index of from about 0.1 g/10 min to about 300 g/10 min;
      ii. a melt index ratio of from about 15 to about 45;
      iii. a weight average molecular weight ($M_w$) of from about 20,000 to about 200,000;
      iv. a molecular weight distribution ($M_w/M_n$) of from about 2.0 to about 4.5;
      v. a $M_z/M_w$ ratio of from about 1.7 to about 3.5; and
      vi. a CDBI of from 20% to 35%; and
   wherein said first polymer is different from said second polymer and wherein the composition has a Dart A Impact Strength of 850 to about 1100 g/mil and an average modulus of the MD and TD 1% Secant Moduli >35.0 kpsi.

2. The polymer composition of claim 1, wherein said ethylene-based polymer further comprises up to about 5 mole % units derived from an alpha-olefin comonomer.

3. An article of manufacture, wherein said article comprises the polymer composition of claim 1, and wherein said article is formed by a manufacturing process selected from the group consisting of injection molding, rotational molding, blow molding, extrusion coating, foaming, casting, and combinations thereof.

4. An article of manufacture, wherein said article comprises the polymer composition of claim 1, and wherein said article is an extruded blown or cast film, or a combination thereof.

5. An article of manufacture according to claim 1, wherein said article is a non-food containing injection molded article.

6. An article of manufacture according to claim 1, wherein said article is a non-liquid containing rotomolded article.

7. The polymer composition of claim 1, wherein the second polymer has a CDBI of from 25% to 28%.

8. An article of manufacture, wherein said article comprises the polymer composition of claim 2, and wherein said article is formed by a manufacturing process selected from the group consisting of injection molding, rotational molding, blow molding, extrusion coating, foaming, casting, and combinations thereof.

9. An article of manufacture, wherein said article comprises the polymer composition of claim 2, and wherein said article is an extruded blown or cast film, or a combination thereof.

10. An article of manufacture according to claim 2, wherein said article is a non-food containing injection molded article.

11. An article of manufacture according to claim 2, wherein said article is a non-liquid containing rotomolded article.

12. An article of manufacture according to claim 4, wherein said article is an extruded monolayer film.

13. An article of manufacture according to claim 4, wherein said article is an extruded multilayer film.

14. An article of manufacture according to claim 9, wherein said article is an extruded monolayer film.

15. An article of manufacture according to claim 9, wherein said article is an extruded multilayer film.

16. A film according to claim 12, wherein the film has been downgauged by at least about 10%.

17. A film according to claim 14, wherein the film has been downgauged by at least about 10%.

18. A film according to claim 13, wherein the film has been downgauged by at least about 10%.

19. A film according to claim 15, wherein the film has been downgauged by at least about 10%.

20. A non-food containing injection molded article according to claim 5, wherein said article exhibits an improved toughness/processability balance relative to the same article made from a Ziegler-Natta catalyzed resin of substantially similar melt index and density.

21. A non-food containing injection molded article according to claim 10, wherein said article exhibits an improved toughness/processability balance relative to the same article made from a Ziegler-Natta catalyzed resin of substantially similar melt index and density.

22. A non-liquid containing rotomolded article according to claim 6, wherein said article exhibits an improved toughness/processability balance relative to the same article made from a Ziegler-Natta catalyzed resin of substantially similar melt index and density.

23. An article of manufacture according to claim 6, wherein said article is formed from powder, micropellets, or combinations thereof.

24. An article of manufacture according to claim 6, wherein said article further comprises color pigments, fillers, or combinations thereof.

25. A non-liquid containing rotomolded article according to claim 11, wherein said article exhibits an improved toughness/processability balance relative to the same article made from a Ziegler-Natta catalyzed resin of substantially similar melt index and density.

26. An article of manufacture according to claim 11, wherein said article is formed from powder, micropellets, or combinations thereof.

27. An article of manufacture according to claim 11, wherein said article further comprises color pigments, fillers, or combinations thereof.

28. A film according to claim 16, wherein the film has been downgauged by at least about 20%.

29. A film according to claim 17, wherein the film has been downgauged by at least about 20%.

30. A film according to claim 28, wherein the film has been downgauged by at least about 30%.

31. A film according to claim 29, wherein the film has been downgauged by at least about 30%.

32. A film according to claim 18, wherein the film has been downgauged by at least about 20%.

33. A film according to claim 19, wherein the film has been downgauged by at least about 20%.

34. A film according to claim 32, wherein the film has been downgauged by at least about 30%.

35. A film according to claim 33, wherein the film has been downgauged by at least about 30%.

36. A film comprising a blend of:
    a. from about 5 to about 95 wt % of a first polymer selected from the group consisting of high density polyethylene, linear low density polyethylene, low density polyethylene, medium density polyethylene, very low density polyethylene, differentiated polyethylene, and combinations thereof; and
    b. from about 95 to about 5 wt % of a second polymer comprising at least one ethylene-based polymer produced by gas-phase polymerization of ethylene with a catalyst having as a transition metal component a bis(n-$C_{3-4}$ alkyl cyclopentadienyl) hafnium compound, wherein said transition metal component comprises from about 95 mole % to about 99 mole % of said hafnium compound and wherein said ethylene-based polymer has:
       a melt index ratio of from about 20 to about 40,
       a molecular weight distribution ($M_w/M_n$) of from about 3.0 to about 4.0,
       a ratio of z-average molecular weight to weight average molecular weight of from about 2.2 to about 3.0, and
       a CDBI of from 20% to 35%,
       wherein the film has a Dart A Impact Strength of 850 to about 1100 g/mil and an average modulus of the MD and TD 1% Secant Moduli >35.0 kpsi.

37. The film of claim 36, wherein the film exhibits:
    a tear MD (g) of from about 200 to about 1000, and
    a tear TD (g) of from about 400 to about 1000, when normalized to 1 mil film thickness.

38. The film of claim 26, wherein the film exhibits:
    a Tensile MD (psi) of from about 6000 to about 9000, and
    a Tensile TD (psi) of from about 5000 to about 8000, when normalized to 1 mil film thickness.

39. The film of claim 36, wherein the second polymer has a CDBI of from 25% to 28%.

* * * * *